US012284405B2

(12) United States Patent
Mittal et al.

(10) Patent No.: US 12,284,405 B2
(45) Date of Patent: *Apr. 22, 2025

(54) ADAPTIVE CONTENT DELIVERY NETWORK

(71) Applicant: V-NOVA INTERNATIONAL LIMITED, London (GB)

(72) Inventors: Gaurav Mittal, London (GB); Simone Ferrara, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,809

(22) Filed: Mar. 10, 2021

(65) Prior Publication Data

US 2021/0329315 A1    Oct. 21, 2021

Related U.S. Application Data

(63) Continuation of application No. 16/324,431, filed as application No. PCT/GB2017/052349 on Aug. 9, 2017, now Pat. No. 10,951,930.

(30) Foreign Application Priority Data

Aug. 9, 2016   (GB) .................................. 1613697
May 26, 2017  (GB) .................................. 1708447

(51) Int. Cl.
H04N 21/2343    (2011.01)
H04L 65/70      (2022.01)
(Continued)

(52) U.S. Cl.
CPC ....... *H04N 21/23439* (2013.01); *H04L 65/70* (2022.05); *H04L 65/75* (2022.05);
(Continued)

(58) Field of Classification Search
None
See application file for complete search history.

(56) References Cited

U.S. PATENT DOCUMENTS 6,674,796 B1      1/2004  Haskell et al.
2003/0135863 A1   7/2003  Van Der Schaar
(Continued)

FOREIGN PATENT DOCUMENTS

CN   101605243   12/2009
CN   102572548    7/2012
(Continued)

OTHER PUBLICATIONS

Wang et al., "Modeling Rate and Perceptual Quality of Scalable Video as Functions of Quantization and Frame Rate and Its Application in Scalable Video Adaptation", IEEE 17th International Packet Video Workshop, May 11-12, 2009.
(Continued)

*Primary Examiner* — James R Marandi
(74) *Attorney, Agent, or Firm* — Workman Nydegger

(57) ABSTRACT

A content delivery network (100) for streaming digital video content across a data network. The content delivery network (100) is configured to receive digital video content. The content delivery network is configured to store the digital video content in a storage format comprising a base layer (B) and an enhancement layer (E), wherein the base layer (B) is decodable to present the digital video content at a base level of video reproduction quality, and the enhancement layer (E) is decodable with the base layer to present the digital video content at an enhanced level of video reproduction quality which is higher than the base level of reproduction quality. The content delivery network (100) is configured to determine, based on a target quality which is to be provided to a client device, which layers to use in order to achieve the target quality; and to use the determined layers (B, E) to
(Continued)

provide the client device with the digital content at the target level of quality.

20 Claims, 20 Drawing Sheets

(51) Int. Cl.
*H04L 65/75* (2022.01)
*H04N 19/00* (2014.01)
*H04N 19/187* (2014.01)
*H04N 21/2347* (2011.01)
*H04N 21/262* (2011.01)
*H04N 21/442* (2011.01)
*H04N 21/845* (2011.01)

(52) U.S. Cl.
CPC ... *H04N 21/2347* (2013.01); *H04N 21/26258* (2013.01); *H04N 21/44209* (2013.01); *H04N 21/8451* (2013.01); *H04N 21/8456* (2013.01); *H04N 19/00* (2013.01); *H04N 19/187* (2014.11)

(56) References Cited

U.S. PATENT DOCUMENTS

| | | |
|---|---|---|
| 2004/0223611 A1 | 11/2004 | Yan |
| 2005/0195899 A1 | 9/2005 | Han |
| 2006/0023748 A1* | 2/2006 | Chandhok ............... H04L 65/70 370/469 |
| 2006/0168323 A1 | 7/2006 | Kim et al. |
| 2007/0239896 A1 | 10/2007 | Sohn et al. |
| 2008/0106640 A1 | 5/2008 | Fleischman |
| 2010/0083303 A1 | 4/2010 | Redei et al. |
| 2010/0094968 A1* | 4/2010 | Zuckerman ......... H04L 67/1097 709/219 |
| 2010/0184414 A1 | 7/2010 | Abraham |
| 2011/0004912 A1 | 1/2011 | Teniou et al. |
| 2011/0211114 A1 | 9/2011 | Cooper |
| 2011/0246761 A1 | 10/2011 | Alexandrov |
| 2011/0299601 A1* | 12/2011 | Lai ..................... H04N 21/8451 375/E7.026 |
| 2012/0124636 A1 | 5/2012 | Schaffer |
| 2012/0170523 A1 | 7/2012 | Civanlar |
| 2012/0254456 A1 | 10/2012 | Visharam et al. |
| 2013/0114744 A1 | 5/2013 | Mutton |
| 2014/0344398 A1 | 11/2014 | Cassidy et al. |
| 2014/0359166 A1* | 12/2014 | Mamidwar ........... H04L 65/765 709/246 |
| 2015/0100667 A1 | 4/2015 | Freyria et al. |
| 2015/0163540 A1 | 6/2015 | Masterson |
| 2016/0088054 A1* | 3/2016 | Hassan ............ H04N 21/23418 709/219 |
| 2017/0272485 A1 | 9/2017 | Gordon |
| 2019/0028743 A1* | 1/2019 | He ..................... H04N 21/2225 |

FOREIGN PATENT DOCUMENTS

| | | |
|---|---|---|
| CN | 102802022 | 11/2012 |
| CN | 103685303 | 3/2014 |
| DE | 202013102162 | 7/2013 |
| EP | 1130920 | 9/2001 |
| EP | 2525587 | 11/2012 |
| JP | 2002-354141 | 12/2002 |
| JP | 2010-212942 | 9/2010 |
| WO | 2000-065838 | 11/2000 |
| WO | 2012-015460 | 2/2012 |
| WO | 2015-034997 | 3/2015 |

OTHER PUBLICATIONS

International Search Report and Written Opinion issued in PCT/GB2017/052349 dated Nov. 10, 2017.
Search Report issued in GB Application No. 1613697.0 dated Feb. 9, 2017.
U.S. Appl. No. 16/324,431, filed Oct. 3, 2019, Office Action.
U.S. Appl. No. 16/324,431, filed Feb. 5, 2020, Office Action.
U.S. Appl. No. 16/324,431, filed Jul. 24, 2020, Office Action.
U.S. Appl. No. 16/324,431, filed Nov. 12, 2020, Notice of Allowance.

* cited by examiner

ADAPTIVE CONTENT DELIVERY NETWORK

CROSS-REFERENCE TO RELATED APPLICATIONS

The present application is a continuation of U.S. patent application Ser. No. 16/324,431, filed Feb. 8, 2019, which is a 371 US National Stage Entry of PCT/GB2017/052349, filed Aug. 9, 2017, which claims priority to UK Patent Application Nos. 1708447.6, filed May 26, 2017, and 1613697.0, filed Aug. 9, 2016, the entire disclosures of which are incorporated herein by reference.

FIELD OF THE INVENTION

The invention broadly relates to the field of delivering encoded data in an encoded data stream particularly, but not exclusively, at one of a plurality of data rates and data qualities. Particularly, but not exclusively, the invention relates to the adaptive bitrate streaming of encoded video data. Particularly, but not exclusively, the invention applies to over-the-top (OTT) distribution of encoded video content.

BACKGROUND OF THE INVENTION

Broadly speaking, adaptive bit rate streaming is a technique of determining, at a client device, the ability of the client device to receive and process an encoded video stream, and adapting the quality of the encoded video stream, in real time, to adjust the quality of the encoded video stream to suit an available bandwidth. The state-of-the-art in practical implementations of adaptive bitrate streaming includes Microsoft.®. Smooth Streaming (MSS), HTTP Live Streaming (HLS) and HTTP Dynamic Streaming.

These types of delivery are a combination of server and client software that detect a client's bandwidth capacity and adjust the quality of the video stream between multiple bitrates and/or resolutions. The adaptive bitrate video experience is superior to the delivery of a static video file from a streaming server at a single bitrate, because the encoded video stream can be switched midstream to suit the client's available network speed. When delivering static video files, there can sometimes exist excessive playback delay due to slow initial buffering speeds, or pauses in playback when the video stream cannot be downloaded quickly enough. Both of these problems are caused when the client's network bandwidth cannot deliver the video content at an optimal speed, and are especially pronounced in situations of variable network bandwidth. Furthermore, the delivery of the static video file may not utilise the full potential of the client device resulting in a sub-optimal video stream being used for presentation by the client device.

Microsoft.®. Smooth Streaming, HTTP Live Streaming, and HTTP Dynamic Streaming each use different protocols to receive video content, and so a client device must support each protocol. A standard for HTTP streaming of multimedia content has been developed, called MPEG-DASH, to enable consistent playback and unification of servers and clients of different vendors.

In general, in MPEG-DASH ("DASH"), multimedia content is captured and stored on an HTTP server and is delivered using HTTP. The content exists on the server in two parts: Media Presentation Description (MPD), which describes a configuration of the available content, its various alternatives, their URL addresses, and other characteristics; and segments, which contain the actual multimedia bit streams in the form of chunks, in single or multiple files.

To play the content, a DASH client first obtains the MPD. The MPD can be delivered using HTTP, email, thumb drive, broadcast, or other transports. By parsing the MPD, the DASH client learns about the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client selects the appropriate encoded alternative and starts streaming the content by fetching the segments using HTTP GET requests.

After appropriate buffering to allow for network throughput variations, the DASH client continues fetching the subsequent segments and also monitors the network bandwidth fluctuations. Depending on its measurements, the DASH client decides how to adapt to the available bandwidth by fetching segments of different alternatives (with lower or higher bitrates) to maintain an adequate buffer.

In addition, there are recent moves towards content-aware encoding, where different bitrate and resolution options are encoded and made available on a per-title basis (i.e. each individual film or television programme is encoded at bitrates and resolutions that suit the particular video content). This has advantages in that some video content can be delivered in very good quality (PSNR around 45 dB) at relatively low bitrates, and so bandwidth efficiencies are achieved, whereas other more complex video content cannot be delivered at certain resolutions (e.g. 1080p) in reasonable quality (at or above 38 PSNR) without being encoded at a relatively high bitrate, and so the bandwidth required to view at that resolution must be relatively high, for optimal viewing experience. Knowing that and how a particular video content should be encoded in multiple resolution/bitrate pairings is a technique which has been put forward by at least Netflix.®. for optimising efficiency and viewing experience of video received via an over-the-top (OTT) architecture.

However, despite adaptive bitrate streaming being a huge improvement over static video file streaming, and finding widespread practical use, there is room to improve adaptive bitrate streaming further. For example, a video content provider (e.g. a broadcaster) is normally required to provide video content to a content delivery network (for OTT) in all format permutations that the broadcaster wishes end video consumers to be able to use.

The various formats include various codecs (MPEG-2, H.264, HEVC), at various levels of resolution (360p, 480p, 720p, 1080p, 2160p, 4320p), and various encoder profiles (reflecting quality in bitrate levels: 16 kbit/s, 400 kbit/s, 1 Mbit/s, 2.5 Mbit/s, 4.5 Mbit/s, 9.8 Mbit/s, 40 Mbit/s and decoding compatibility). This causes:
1. high encoding overhead at the video content source to encode all format permutations for the video content;
2. high file storage overhead in the content delivery network to store all format permutations;
3. high caching storage overhead at edge servers of the content delivery network to cache necessary format permutations;
4. delay when switching to a different format (e.g. for consumer bandwidth fluctuations) as different format requested by and sent to edge server;
5. high file management overhead to manage format permutations;

6. lack of flexibility, as further encoding of video content is required into new format permutations when technology advances (e.g. the introduction of 4K HEVC), further increasing overheads and delay in points above.

More recently, transcoding techniques within a content delivery network have been proposed to mitigate the above listed problem of high encoding overhead at the video-content source. Here, a single version of the video content at a maximum level of quality is provided to a content delivery network which then creates all necessary versions to serve various video clients at various bandwidths as needed. However, there exists a need to mitigate or solve the remaining problems with minimal impact to the video delivery ecosystem.

SUMMARY OF THE INVENTION

In a first aspect of the disclosure, there is provided a content delivery network and method of providing video content across a data network as set out in the appended claims, and further in all of the dependent claims.

Generally, there is provided a content delivery network for streaming digital video content across a data network. The content delivery network is configured to receive digital video content. The content delivery network is configured to store the digital video content in a storage format comprising a base layer and an enhancement layer, wherein the base layer is decodable to present the digital video content at a base level of video reproduction quality, and the enhancement layer is decodable with the base layer to present the digital video content at an enhanced level of video reproduction quality which is higher than the base level of reproduction quality. The content delivery network is configured to determine, based on a target quality which is to be provided to a client device, which layers to use in order to achieve the target quality; and to use the determined layers to provide the client device with the digital content at the target level of quality.

In this way, the number of versions of data that needs to be stored, managed and sent within the content delivery network is reduced. A single hierarchical layered file is created. Enhancement layers are only requested, received and stored when end video consumers require a higher than base level of quality of the video content. Transmission overhead in the content delivery network is reduced, as is caching storage in the edge servers (remote delivery servers). The speed of delivery of video content to video clients is increased also, as the base layer may be provided to a video client immediately by the content delivery network, while the enhancement layer is obtained within the content delivery network and delivered shortly thereafter.

One or several enhancement layers can be used, and transcoding at the edge servers can create fine granularity in the type of video format provided to end video consumers (codec family, resolution, frame rate, bitrate and so on).

Also, a fully dynamic and adaptive streaming technique is achieved. For example, if required, an edge server in the data network is able to use only the base layer segment for transcoding, without using the enhancement layer segment, thus decreasing the time taken to have the video content delivered in a useable form to a video consumer. There is no need to wait for the enhancement layer, or process the data in the enhancement layer. By transcoding on-the-fly at the delivery servers, network bandwidth to the video consumer is used in a nearly optimal manner as the transcoder is able to react to network bandwidth fluctuations in a real-time or near real-time manner. The bitrate and/or resolution may be altered upwardly or downwardly, to suit an upwardly or downwardly varying bandwidth connection, respectively.

In a second aspect of the disclosure, there is provided a server, video client and associated methods of providing video content across a data network as set out in the appended claims, and further in all of the dependent claims.

Generally, there is provided a server for providing digital video content to a video client. The server is configured to receive digital video content from a content delivery network, the digital video content being in a delivery format of the content delivery network. The server is also configured to convert the digital video content from the delivery format of the content delivery network to provide the digital video content in a playback format of a video client requesting the digital video content. The server is also configured to output the digital video content in the playback format for the video client.

In this way, the number of versions of data that needs to be stored, managed and sent within the content delivery network is reduced, or at least any modifications required to existing content delivery networks can be reduced or even eliminated, while a video client is able to receive digital video content in a playback format which is more likely to be optimised for playback on that device.

In some implementations, a hierarchical layered file is created on the server in a secondary format. Enhancement layers are only generated when end video consumers require a higher than base level of quality of the video content. Transmission overhead is reduced, as is caching storage in the server. The speed of delivery of video content to video clients is increased also, as the base layer may be provided to a video client immediately by the server, while the enhancement layer is obtained within the content delivery network and delivered shortly thereafter.

One or several enhancement layers can be used, and transcoding at the server can create fine granularity in the type of video format provided to end video consumers (codec family, resolution, frame rate, bitrate and so on).

Also, a fully dynamic and adaptive streaming technique is achieved. For example, if required, the server is able to use only a base layer segment for transcoding, without using an enhancement layer segment, thus decreasing the time taken to have the video content delivered in a useable form to a video consumer. There is no need to wait for the enhancement layer, or process the data in the enhancement layer. By transcoding on-the-fly at the server, network bandwidth to the video consumer is used in a nearly optimal manner as the transcoder is able to react to network bandwidth fluctuations in a real-time or near real-time manner. The bitrate and/or resolution may be altered upwardly or downwardly, to suit an upwardly or downwardly varying bandwidth connection, respectively.

Also, the latest transcoding, transrating and transizing technology can be implemented in the server without having to modify the content delivery network. Likewise, the latest codecs may be used, creating broader compatibility between video producers, content delivery networks and video clients.

Additionally, the present invention could provide the following further advantages. First, it would allow to decrease the costs of encrypting and decrypting the overall content as only the base layer needs to be encrypted to protect the content (as further described in patent publication numbers WO 2013/011496 and U.S. Ser. No. 13/188,237 which are incorporated herein by reference). Second, it would allow reduction of the storage needed to store all the various video profiles as only incremental enhancements need to be stored. This would be particularly beneficial to a number of applications such as Cloud/Network Digital/Personal Video Recording (DVR/PVR). Thirdly, it would allow reduction of the power consumption for Content Delivery Network (CDN) and encoders as less encoding and less storage is required. Fourth, since the algorithm is agnostic of the underlying transport mechanism, the invention could be applied to any existing Adaptive Bit Rate techniques (e.g., Apple.®. HLS, MPEG DASH, etc.) and therefore can be flexibly deployed over existing and future services.

BRIEF DESCRIPTION OF THE DRAWINGS

Embodiments of the invention will now be described with reference to the accompanying drawings, in which.

DETAILED DESCRIPTION OF THE EMBODIMENT(S)

Embodiments of the present inventions will be now described with reference to the attached Figures. It is to be noted that the following description is merely used for enabling the skilled person to understand the present invention, without any intention to limit the applicability of the present invention to other embodiments which could be readily understood and/or envisaged by the reader.

Figure 1:
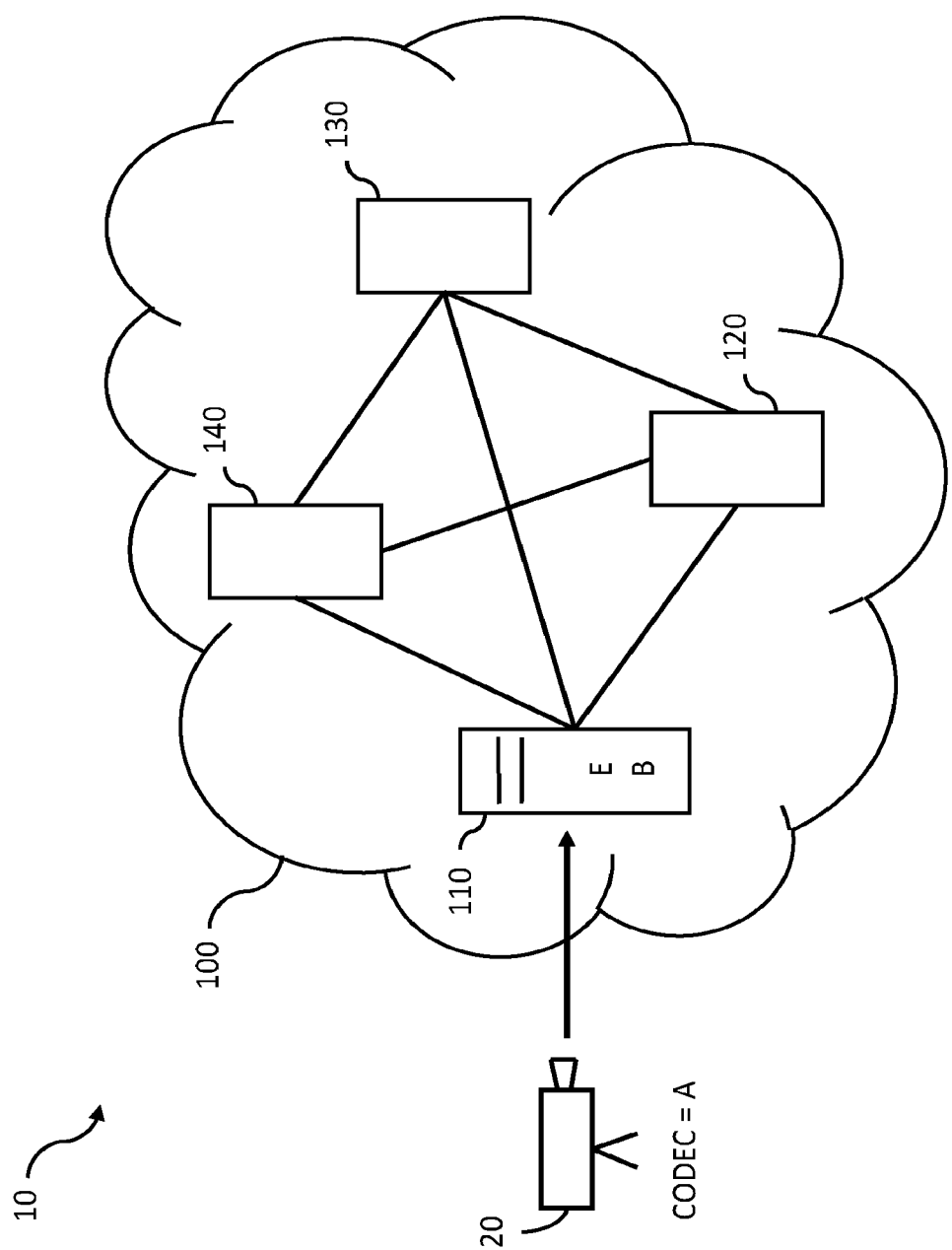
FIG. 1 is a block diagram showing a system for delivering digital video data to video clients over a content delivery network.

FIG. 1 is a block diagram showing a simplified system 10 according to a first embodiment for delivering digital video content to video clients 210, 220, 230, 235, 240 (shown in later figures). The system 10 comprises a video source 20 which produces or provides digital video content to the system 10, and a content delivery network 100 which manages and delivers the video content to the video clients 210, 220, 230, 235, 240.

The video source 20 can be any video source, such as a digital video camera or a computer file system or server which is arranged to contribute digitised or digital video content to the content delivery network 100. The digital video content is either "on demand" content for consumption at a future point in time, or is "live" content which is for immediate consumption.

The content delivery network 100 comprises a number of servers which are arranged to deliver the video content to the video clients 210, 220, 230, 235, 240, typically when requested to do so by the video clients 210, 220, 230, 235, 240 themselves. In a typical implementation, the content delivery network 100 is arranged to have an origin server 110 which receives and stores the digital video content from the video source 20, and several delivery servers, or edge servers 120, 130, 140. In practice, origin servers may act as edge servers, and vice versa depending on how the content delivery network 100 is configured and the source of the video content. The content delivery network 100 exists to provide quick, robust delivery of video content to multiple video clients in geographically different locations. By having more than one server, and by caching information on the delivery servers, requests for video content can be handled quicker because the video content may be located at a delivery server 120, 130, 140 which is located nearer to the requesting video client than the origin server 110, or via a more robust, quicker or cheaper data communication path. Likewise, the number of requests for video content is distributed amongst the servers 110, 120, 130, 140 and is not handled at a single server, therefore reducing the risk of capacity problems at a given server. By caching video content at the delivery servers 120, 130, 140, bandwidth within the content delivery network is used more efficiently, as otherwise the same video content must be sent several times from the origin server 110 to the delivery servers 120, 130, 140 to handle multiple different requests for the video content. Each delivery server may source the required video content from the origin server 110 or, preferably, another delivery server if the video content is available at the delivery server and that delivery server is geographically closer to the requesting delivery server, or is connected via a more robust, quicker or cheaper data communication path. However, the system may be improved.

The content delivery network 100 of FIG. 1 is arranged to receive the video content from video source 20 and to store the video content into a storage format suitable for saving bandwidth and file storage space within the content delivery network. The video content, in some situations, is converted into the storage format from the source format provided by the video source 20. In other situations, the video content is provided in the storage format by the video source 20. The video content is received by and stored in the required format on the origin server 110, or is stored elsewhere on the content delivery network 100 as appropriate.

The storage format is hierarchical and uses the concept of hierarchical layers to store the video content in a way which uses network bandwidth and storage space advantageously and efficiently. The required format comprises a base layer and an enhancement layer, wherein the base layer is decodable to present the digital video content at a base level of video reproduction quality, and the enhancement layer is decodable with the base layer to present the digital video content at an enhanced level of video reproduction quality which is higher than the base level of reproduction quality.

There may be more than one enhancement layer, with each successive enhancement layer adding further information to the base layer, and optionally, previous enhancement layers in the hierarchy. An enhancement layer may be logically split to provide varying levels of quality enhancements, each of which may be used or ignored as necessary.

As shown in FIG. 1, in the example embodiment, the origin server 110 stores the video content in the storage format as a base layer, indicated as B, and an enhancement layer, indicated as E. Ideally, the origin server 110 stores the video content at a maximum or near maximum level of quality as provided by the video source 20. Ideally, lossless or near lossless compression is used to store the video content the storage format (as measured when using all hierarchical layers for reproduction), and/or a copy of the video content as provided by the video source 20 is stored by the content delivery network 100, so that should it be required, a new version of the video content in the storage format can be recreated from the copy. Here, the storage format would remain hierarchical but would differ in its specification from a previous version, perhaps to keep pace with changing video standards and requirements in order to serve video clients successfully with the video content with appropriate frame sizes, at appropriate frame rates, with an appropriate signal-to-noise level, at an appropriate bitrate, and using an appropriate encoding scheme, such as successors to the MPEG family or H.264/265 family of encoding schemes.

Figure 2:
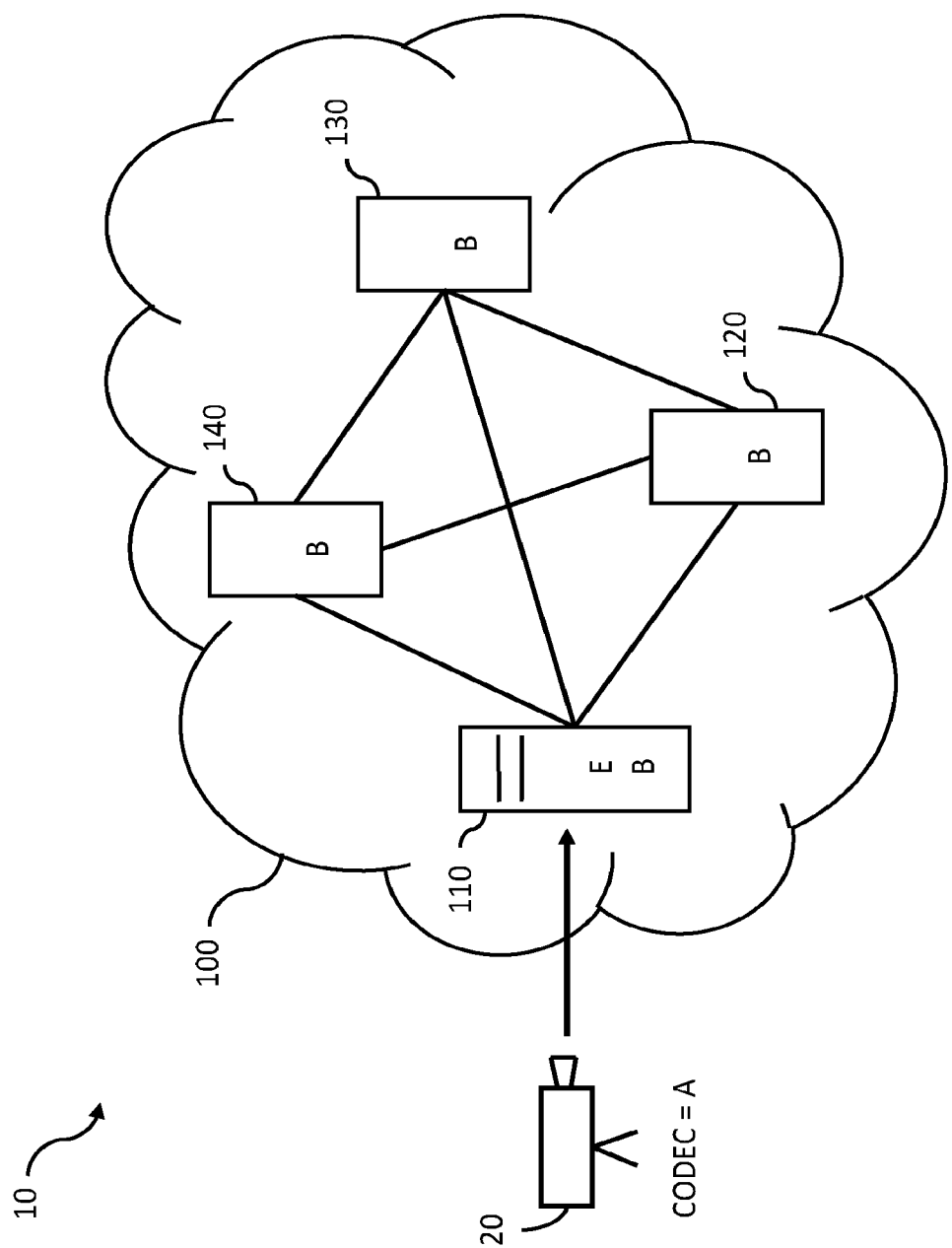
FIG. 2 is a block diagram showing a pre-warming of delivery servers in the system of FIG. 1.

FIG. 2 is a block diagram showing the system 10 of FIG. 1 in which delivery servers 120, 130 and 140 are pre-warmed. Here, the delivery servers 120, 130, 140 are provided with copies at a lower than maximum quality of the video content in advance of requests therefor from video clients. However, the delivery servers 120, 130, 140 are not provided with all of the storage format representing the video content, and are instead provided with a subset of the storage format. In this example, the delivery servers 120, 130, 140 are provided with the base layer data, B. The base layer data allows the video content to be decoded and presented to a user at a compliant video client at a base level of video quality, and so each delivery server is able to provide at least the base level of video quality to video clients without referring back to the origin server 110 or other delivery servers for video data of the video content.

This increases the speed at which the video content is displayable on a video client following a request for the video content from the video client. Also, the bandwidth and storage usage within the content delivery network 110 is reduced as only the base layer is uploaded to and stored on the delivery servers 120, 130, 140. In other implementations, the base layer and one or more enhancement layers may be uploaded during a pre-warming process to one or more delivery servers, and, so long as the upload does not include the top enhancement layer in the hierarchy, bandwidth and storage efficiencies may be obtained.

If a video client is not compliant with the encoding scheme underlying the storage format, then the content delivery network 100 is arranged to transcode the video content from the storage format to a compliant format. For example, the storage format may represent the video content encoded with a particular codec which is not supported by the video client, and the content delivery network 100 is arranged to transcode the storage format into a format using a codec which is supported by the video client. If possible, the content delivery network 100 uses only the base layer to transcode, but will use the enhancement layer or layers as necessary to obtain the necessary data to create a required frame size, frame rate, PSNR level and bitrate, with the video content being encoded using a coding scheme supported by the video client. In one implementation, the server which is arranged to serve, directly, the video client device performs the transcoding. In this situation, the enhancement layer or layers are pulled by the server as needed.

Also, the content delivery network 100 is arranged to transrate or transsize the video content prior to delivery to a video client, for example when the bandwidth connection between the content delivery network 100 and the client device is insufficient to stream the video content at the bitrate of the storage format. Transrating and/or transsizing is performed to transrate the base layer version, or the enhancement layer version(s) of the video content, to a suitable bitrate. Transrating and/or transsizing can also be performed in addition to transcoding. In one implementation, the server which is arranged to serve, directly, the client device performs the transrating and/or transsizing. In this situation, the enhancement layer or layers are pulled by the server as needed.

Figure 3:
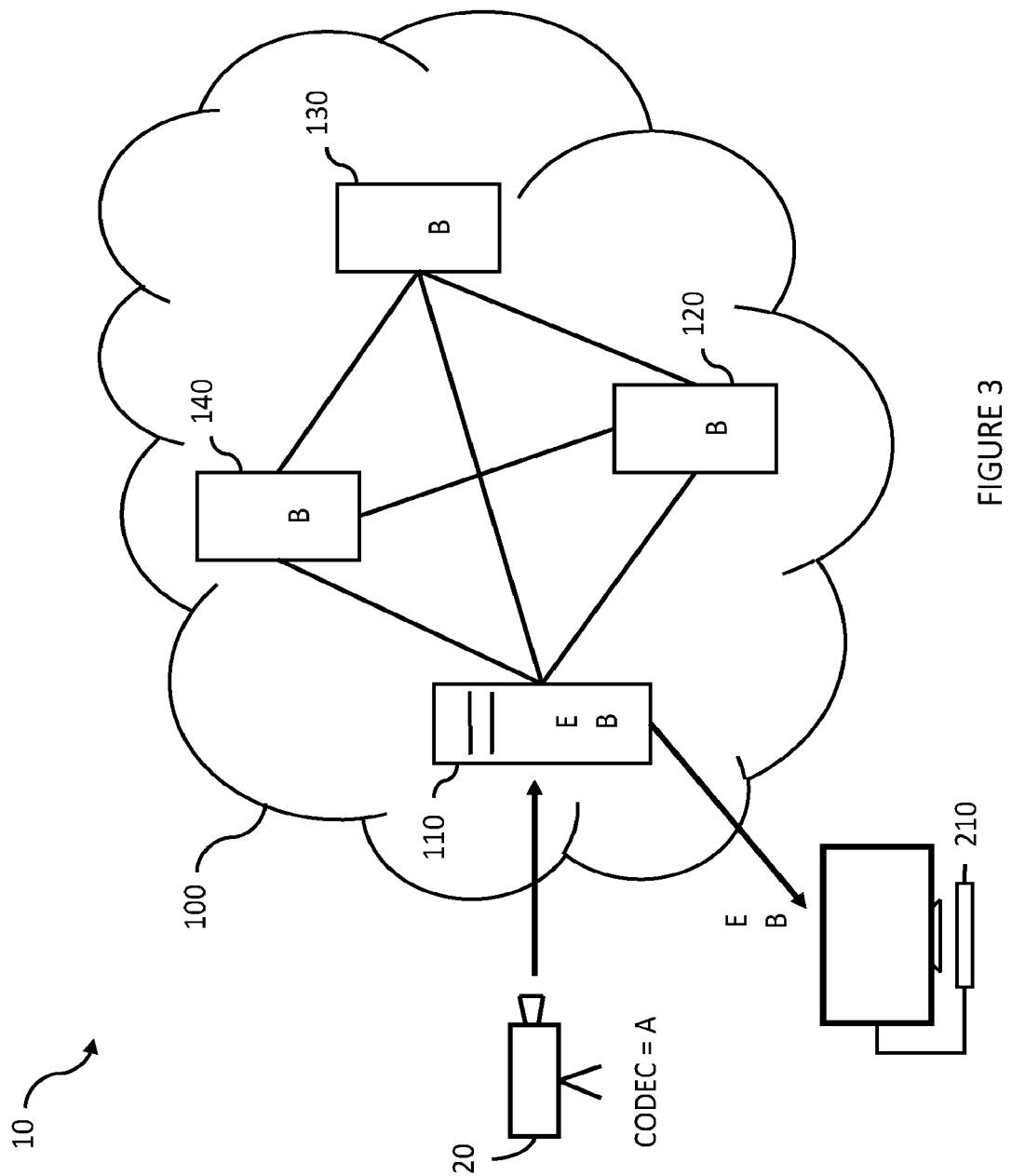
FIG. 3 is a block diagram showing the system of FIG. 1 in which a first client device requests the video content from the content delivery network.

FIG. 3 is a block diagram showing the system 10 of FIG. 1 in which a first client device 210 requests the video content from the content delivery network 100.

In this example, the first client device 210 is a set-top box which is arranged to stream video content over-the-top ("OTT") of a public communications network, such as the Internet. Here, the set-top-box 210 is a relatively advanced set-top-box and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The set-top box 210 is also compatible with 1080p HDTV and lower resolutions.

The set-top box 210 is connected to the content delivery network 100 through origin server 110, which is best suited to serve the set-top box 210 because of geographical, speed, robustness or cost considerations. The bandwidth connection between the set-top box 210 and the origin server is excellent, and can support the highest quality of video able to be decoded by the set-top box. Also, set-top box 210 is compliant with the storage format and so can decode the video content directly when provided in the storage format.

Origin server 110 therefore serves the video content to the set-top box 210 in the maximum version of the storage format, that is, serving both the base layer B and the enhancement layer E. If the bandwidth of the data connection between the set-top box 210 and the origin server 110 reduces, then the origin server 110 or the set-top box 210 can decide to stream the video content at a lower bitrate, by lowering the frame size, frame rate, PSNR quality level, and/or by changing the encoding scheme. This may be achieved by dropping the enhancement layer data from transmission, or by transcoding and/or transrating and/or transsizing the video content at the origin server 110.

Figure 4:
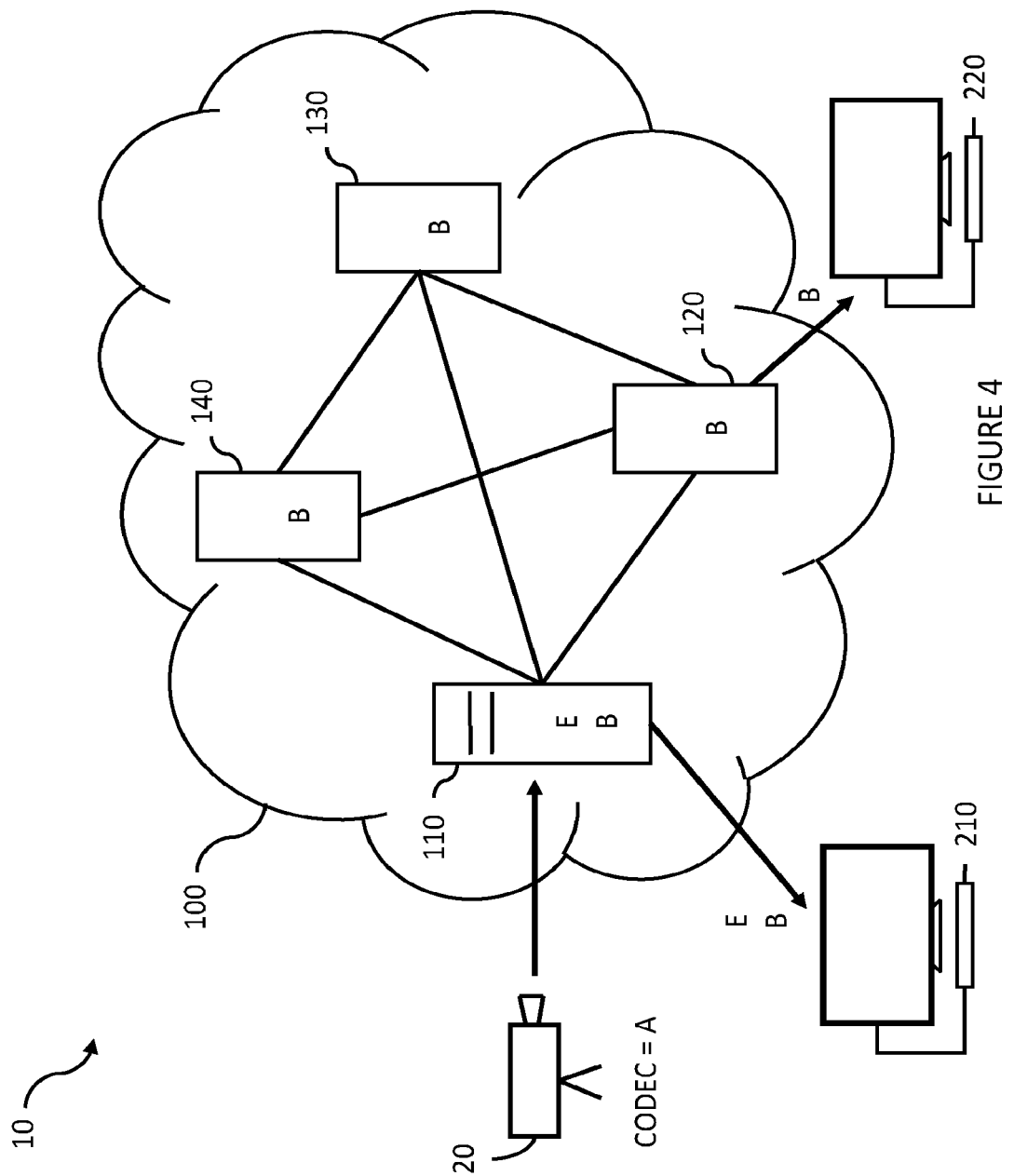
FIG. 4 is a block diagram showing the system of FIG. 3 in which a second client device requests the video content from the content delivery network.

FIG. 4 is a block diagram showing the system 10 of FIG. 3 in which a second client device 220 requests the video content from the content delivery network 100.

In this example, the second client device 220 is another set-top box which is arranged to stream video content over-the-top ("OTT") of a public communications network, such as the Internet. Here, the set-top-box 220 is less capable in relation to the first set-top box 210, and can decode 1080p HDTV and lower resolutions and frame sizes, but not higher resolutions and frame sizes.

The second set-top box 220 is connected to the content delivery network 100 through delivery server 120, which is best suited to serve the set-top box 220 because of their respective and relative geographical locations. The bandwidth connection between the second set-top box 220 and the origin server is good, and can support the highest quality of video able to be decoded by the set-top box. Also, second set-top box 220 is compliant with the storage format and so can decode the video content directly in the storage format. Delivery server 120 therefore serves the video content to the second set-top box 220 in a version of the storage format best suited to the capabilities of the second set-top box 220, that is, by serving only the base layer B and not the enhancement layer E, or a subset of multiple enhancement layers where multiple enhancement layers are used. If the bandwidth of the data connection between the second set-top box 220 and the delivery server 120 reduces, then the delivery server 120 or the second set-top box 220 can decide to stream the video content at a lower bitrate, by lowering the frame size, frame rate, PSNR quality level, and/or by changing the encoding scheme. This is achieved by transcoding and/or transrating and/or transsizing the video content in the content delivery network 100, and advantageously at the delivery server 120.

In this example, no further data representing the video content need flow around the content delivery network 100 in order to serve the second video client 220.

Figure 5:
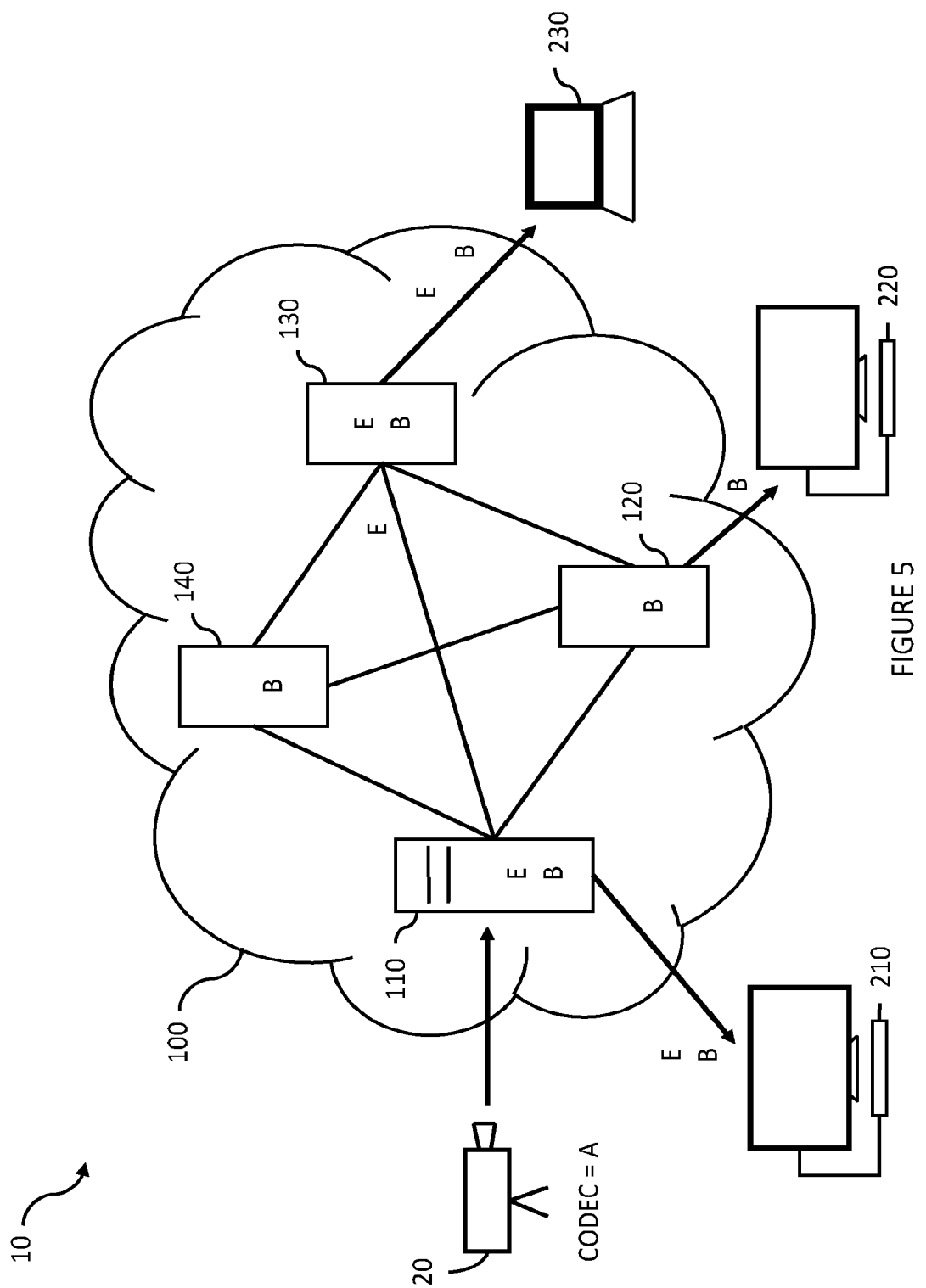
FIG. 5 is a block diagram showing the system of FIG. 4 in which a third client device requests the video content from the content delivery network.

FIG. 5 is a block diagram showing the system 10 of FIG. 4 in which a third client device 230 requests the video content from the content delivery network 100.

In this example, the third client device 230 is a laptop computer which is arranged to stream video content over-the-top ("OTT") of a public communications network, such as the Internet. Here, the third client device 230 is as capable as the first set-top box 210, and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The third client device is also compatible with 1080p HDTV and lower resolutions.

The laptop computer 230 is connected to the content delivery network 100 through delivery server 130, which is best suited to serve the laptop computer because of their respective and relative geographical locations and speed of data communication. The bandwidth connection between the second set-top box 220 and the origin server is excellent, and can support the highest quality of video able to be decoded by the set-top box. Also, laptop computer 230 is compliant with the storage format and so can decode the video content directly in the storage format. In this example, delivery server 130 has not yet cached the enhancement layer E data for the video content, and so origin server 110 (or another delivery server which has cached the enhancement layer data E) serves the enhancement layer data E of the video content to the delivery server 130. The delivery server is now able to serve the laptop computer 230 with the base layer B and the enhancement layer E. In one implementation, the base layer B representing a unit or segment of the video content is served while the corresponding enhancement layer E data is being received at the delivery server 130, and the enhancement layer E data is subsequently delivered to the laptop computer 130 when available.

In this way, the enhancement layer E data need only be sent to and stored at the delivery server 130 when needed to serve a video client with an appropriate level of video quality. This saves bandwidth use within the content delivery network 100 and also storage space at each delivery server. Additionally, if the laptop computer 230 had accessed the content delivery network 100 via delivery server 120 instead of delivery server 130, then similarly the enhancement layer E would be received by the delivery server 120 only when needed to serve the laptop computer 230. Delivery server 120 would have served and would continue to serve second set-top box 220 using the base layer B only.

If the bandwidth of the data connection between the laptop computer 230 and the delivery server 130 reduces, then the delivery server 130 or the laptop computer 230 can decide to stream the video content at a lower bitrate, by lowering the frame size, frame rate, PSNR quality level, and/or by changing the encoding scheme. This is achieved by sending only the base layer, a subset of multiple enhancement layers where multiple enhancement layers are used, or by transcoding and/or transrating and/or transsizing the video content in the content delivery network 100, and advantageously at the delivery server 130. If some or all of the enhancement layer data is not required as a result of a decrease in data communication speed between the laptop computer 230 and the delivery server 130, then the delivery server 130 can relay that message within the content delivery network 100 and/or stop streaming or requesting the enhancement layer data E within the content delivery network, in this example from origin server 110. The enhancement layer E data can be obtained at the delivery server 130 only when needed to server one or more video clients with the appropriate level of video quality for the video content. This saves bandwidth within the content delivery network 100 and storage space at each delivery server.

Figure 6:
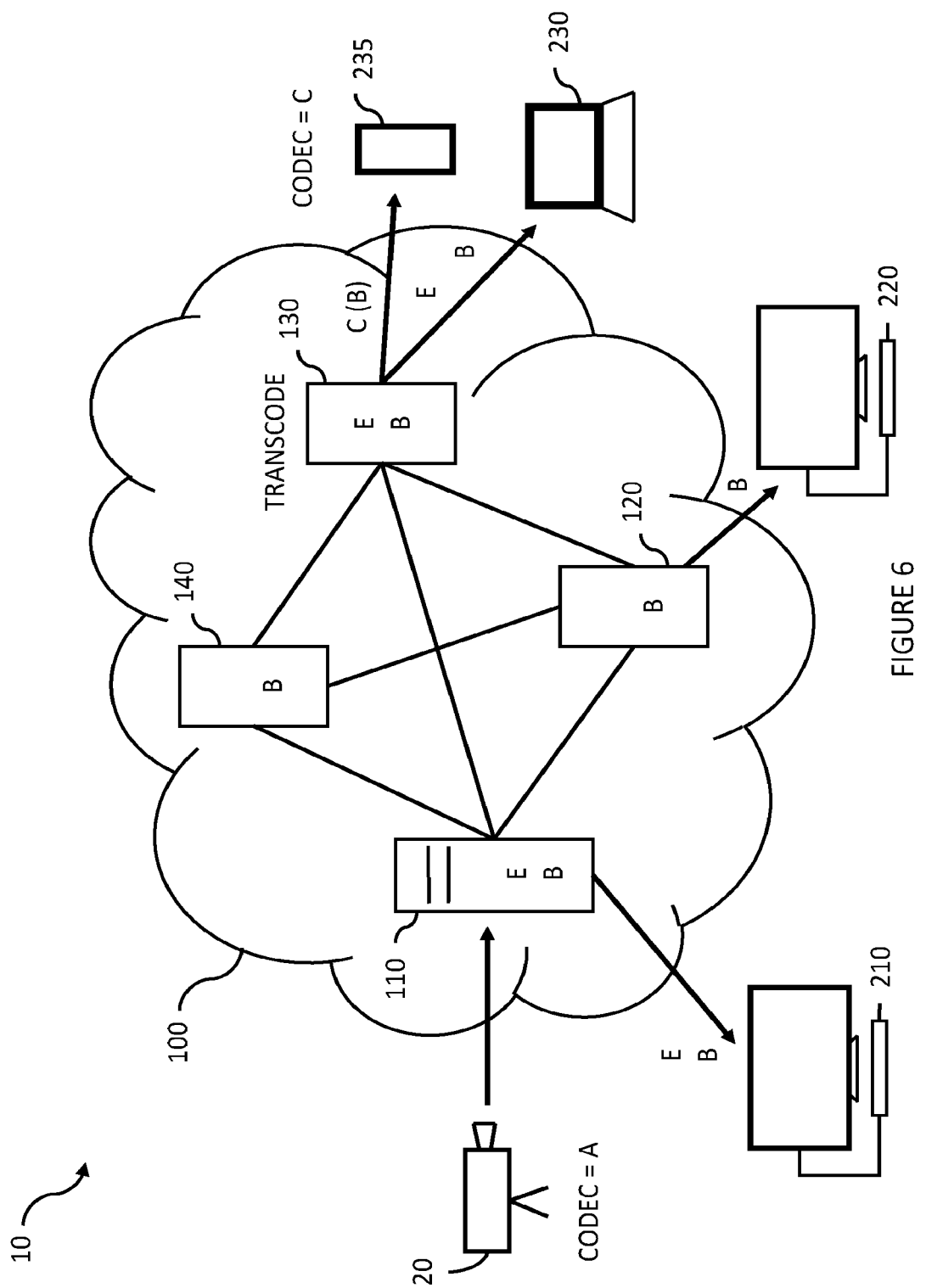
FIG. 6 is a block diagram showing the system of FIG. 5 in which a fourth client device requests the video content from the content delivery network.

FIG. 6 is a block diagram showing the system 10 of FIG. 5 in which a fourth client device 235 requests the video content from the content delivery network 100.

In this example, the fourth client device 235 is a mobile telephone with video playback capability, and could be a tablet computer. The fourth client device 235 is arranged to stream video content over-the-top ("OTT") of a public communications network, such as the Internet, or via a cellular data connection. Here, the mobile telephone 235 is as capable as the first set-top box 210, and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The mobile telephone 235 is also compatible with 1080p HDTV and lower resolutions.

The mobile telephone 235 is connected to the content delivery network 100 through delivery server 130, which is also the point of contact for laptop computer 230. The bandwidth connection between the mobile telephone 235 and the delivery server 130 is adequate to support a medium quality of video to be streamed by the mobile telephone 235. Mobile telephone 235 is not compliant with the storage format and so cannot decode the video content directly in the storage format. Instead, the mobile telephone 235 requires the video content to have been encoded using encoding scheme C. In this scenario, the delivery server 130 is arranged to transcode the video content from the encoding scheme of the storage format to encoding scheme C using the base layer B but not the enhancement layer E because the enhancement layer data is not needed to provide the video content at the required quality at the mobile telephone 235.

The transcoding can involve changing the codec used (e.g. from H.264 to MPEG-2), or changing coding parameters or other coding arrangements (including hierarchical arrangements) to ensure compatibility. In this example, the encoding standard required by mobile telephone 235 is not compatible with the storage format (which may be the original encoding standard and set-up used to create the video content), nor the encoding used to create the storage format (if different to the original encoding standard and set-up).

By transcoding only the base layer and not the enhancement layer, computational resources are used more efficiently and the transcoding can be performed more quickly.

Figure 7:
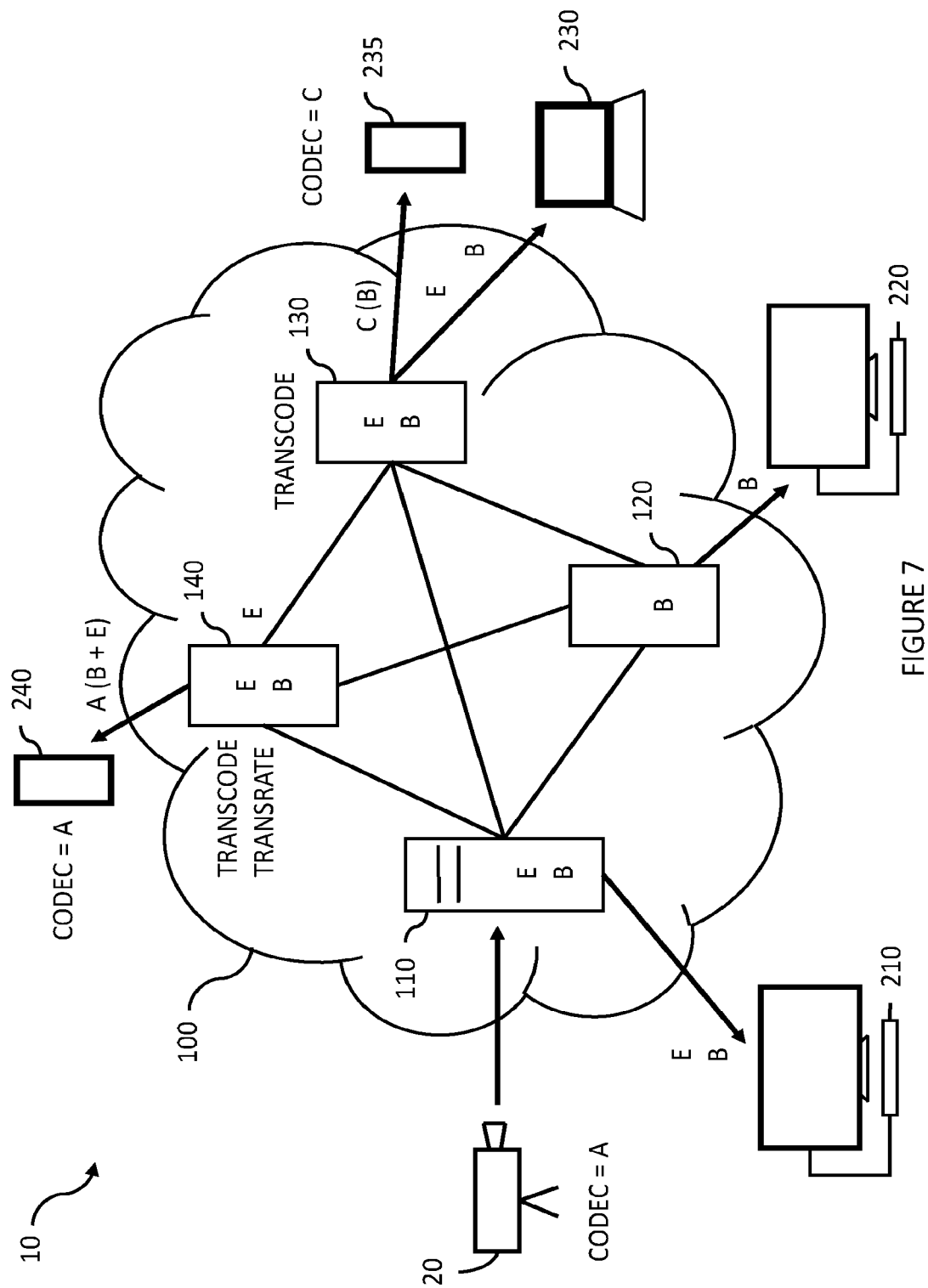
FIG. 7 is a block diagram showing the system of FIG. 6 in which a fifth client device requests the video content from the content delivery network.

FIG. 7 is a block diagram showing the system 10 of FIG. 6 in which a fifth client device 240 requests the video content from the content delivery network 100.

In this example, the fifth client device 240 is a mobile telephone with video playback capability, and could be a tablet computer or any other device with video playback capability. The mobile telephone 240 is arranged to stream video content over-the-top ("OTT") of a public communications network, such as the Internet, or via a cellular data connection. Here, the mobile telephone 240 is as capable as the first set-top box 210 and mobile telephone 235, and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The mobile telephone 240 is also compatible with 1080p HDTV and lower resolutions.

The mobile telephone 240 is connected to the content delivery network 100 through delivery server 140. The bandwidth connection between the mobile telephone 240 and the delivery server 130 is adequate to support the highest quality of video able to be decoded by the mobile telephone 240. Mobile telephone 240 is not compliant with the storage format and so cannot decode the video content directly in the storage format. Instead, the mobile telephone 240 requires the video content to have been encoded using encoding scheme A (which is the original encoding scheme used to encode the video content). In this scenario, the delivery server 140 is arranged to transcode the video content from the storage format to encoding scheme A because the storage format is not compatible with encoding scheme A. In this example, some transcoding was used to create the storage format. The transcoding back to encoding scheme A uses both the base layer B and the enhancement layer E because the enhancement layer data is needed to provide the video content at a high enough quality. Also, the digital video data provided to the mobile telephone 240 is at a lower bitrate when compared to the original bitrate of the video content as provided by the video source 20. This is achieved by transrating at the delivery server 140.

The transcoding can simply involve putting the base layer and the enhancement layer into a more typical single layer format if the video client cannot handle a multi-layer structure, or can involve changing the codec used, or changing coding parameters to ensure compatibility. Transsizing may be carried out when a frame resolution need of a video client is to be met.

The enhancement layer E data is only provided to the delivery server 240 when needed to serve a video client, directly or using transcoding.

While the above examples have been described with a base layer and a single enhancement layer, the advantages achieved are enhanced by providing varying levels of enhancement layer data, either by providing a plurality of enhancement layers or by providing a single enhancement layer which is logically partitioned. In this way, video clients can be served with the video content at various resolutions, at various frame rates, at various bit rates, and also at various PSNR ratios. Only the enhancement layers needed to produce the required video quality at a given time need be sent to each server. Some enhancement layer data may be cached at the servers as needed.

For example, one particular storage format may use an H.264/AVC codec having a base layer and two enhancement layers or two logical partitions within a single enhancement layer file. The base layer has a bit rate of 3.5 Mbit/s and is decodeable to present the digital video content at a base level of video reproduction quality, which in this example is 1080p @ 30 fps. Here, the PSNR is better than 40 dB. The first enhancement layer or logical section allows the base layer reproduction to be upscaled to 4K UHD @ 30 fps and the data in the first enhancement layer has a bit rate of 2.5 Mbit/s making a cumulative bit rate for the base layer and first enhancement layer of 6 Mbit/s. The second enhancement layer, or logical partition, allows the video reproduction from the base layer and first enhancement layer to be upscaled to 8K UHD @ 30 fps. The second enhancement layer has an individual bit rate of 3 Mbit/s making a cumulative bit rate for the base layer, first enhancement layer and second enhancement layer of 9 Mbit/s.

In another example, the storage format uses an MPEG2 compliant codec and has a base layer and three enhancement layers. The base layer provides a video resolution of 240p @ 15 fps and has a bit rate of 400 Kbit/s. The first enhancement layer provides additional data to upscale the resolution from 240p to 480p and also increase the frame rate from 15 fps to 30 fps. The first enhancement layer has a bit rate of 600 Kbit/s and the base layer and first enhancement layer have a cumulative bit rate of 1 Mbit/s. The second enhancement layer upscales to 720p @ 30 fps and the cumulative bit rate is 2 Mbit/s. The third enhancement layer upscales to 1080p @ 30 fps and the cumulative bit rate for all layers is 3 Mbit/s.

Full discussions on how the base layers and enhancement layers are encoded are given in international patent applications published as WO 2013/171173, WO 2014/170819, U.S. Ser. No. 13/188,226 and U.S. Ser. No. 13/188,201 all of which are incorporated herein by reference.

Whilst the above examples relate to the provision of encoding video content, the techniques are generally applicable to any type of data with scalable quality output such as audio data, still images in two or multiple dimensions, volumetric data, and three-dimensional video data.

While the examples shown relate to OTT delivery of video over a data communications network including at least a public network part, such as the Internet, the content delivery network 100 could be a private network.

Figure 8:
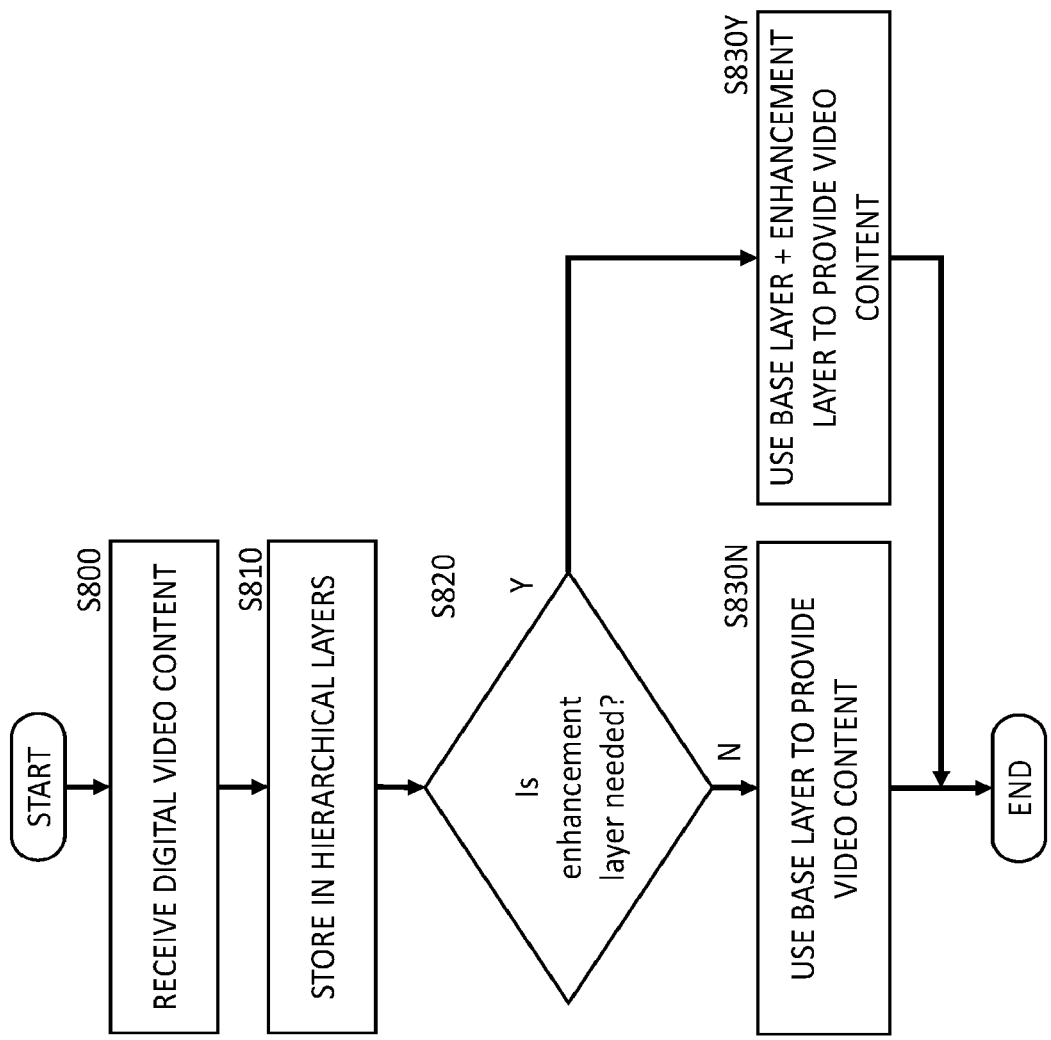
FIG. 8 is a flow chart outlining a method of streaming digital video content across a data network.

FIG. 8 is a flow chart outlining a method of streaming digital video content across a data network.

The flow chart is described with reference to the steps shown inn FIG. 8 in ascending number order as follows:

S800: Digital video content is received at the content delivery network. The digital video content may be in a desired storage format or may be converted into the desired storage format by the content delivery network.

S810: The digital video content is stored in the storage format and comprises a base layer and an enhancement layer. The base layer is decodeable to present the digital video content at a base level of video reproduction quality. The enhancement layer is decodeable with the base layer to present the digital video content at an enhanced level of video reproduction quality.

S820: A determination is made, based on a target quality which is to be provided to a client device, on which layers are to be used in order to achieve the target quality at the client device.

S830N: If no enhancement layer data is required, the method is configured to use the base layer to provide the digital video content to the client device. The base layer may be provided directly to the client device or may be transcoded and/or transrated and/or transsized as required by the content delivery network.

S830Y: If it is determined that at least some enhancement layer data is required to provide the digital video content at the target quality which is to be provided to the client device, then enhancement layer data is obtained and is used together with the base layer to provide the client device with the digital video content at the target level of quality. The enhancement layer data may at this point, prior to being required, be delivered to an appropriate point in the content delivery network, specifically to a delivery server which is serving the video client with the digital video content.

Further features of the method will be apparent from the description of the content delivery network in relation to FIGS. 1 to 7.

Figure 9:
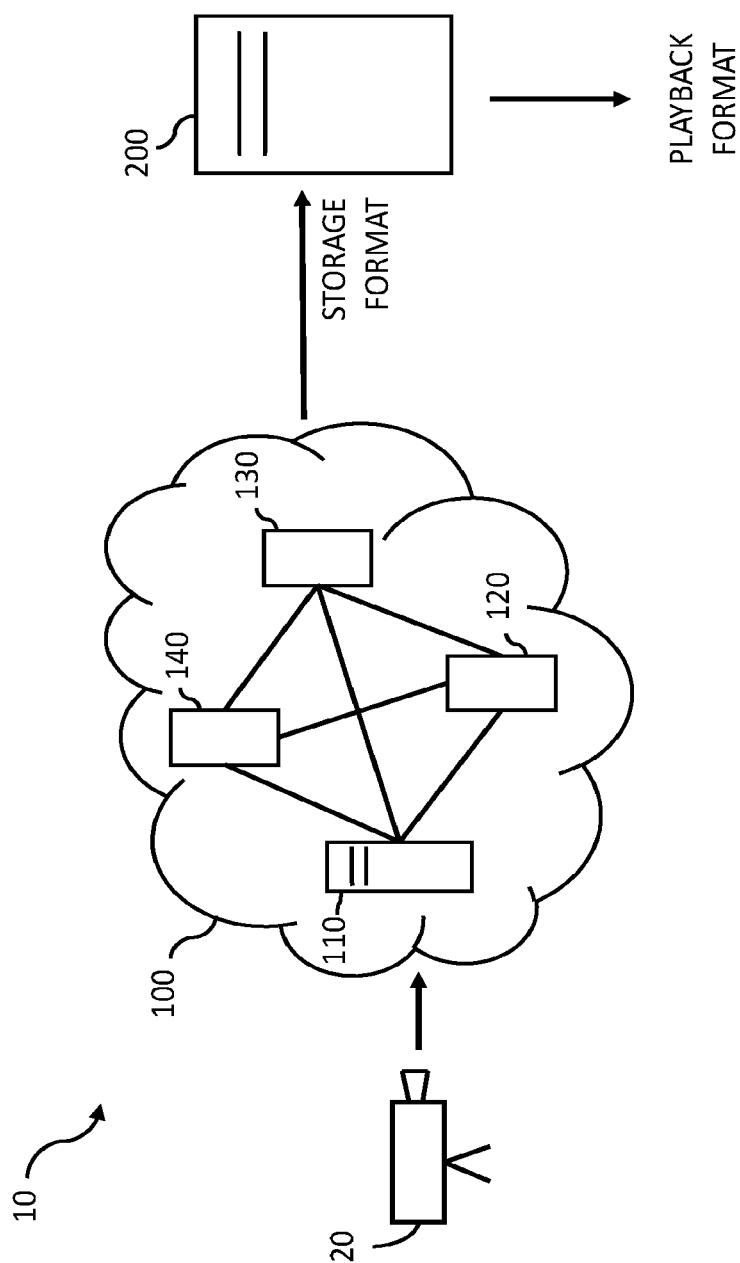
FIG. 9 is a block diagram showing a system for delivering digital video data over a content delivery network.

FIG. 9 is a block diagram showing a system 10 according to a second embodiment for delivering digital video content. The system 10 comprises a video source 20 which produces or provides digital video content to the system 10, a content delivery network 100 which manages and delivers the video content, and a separate server 200.

The video source 20 can be any video source, such as a digital video camera or a computer file system or server which is arranged to contribute digitised or digital video content to the content delivery network 100. The digital video content is either "on demand" content for consumption at a future point in time, or is "live" content which is for immediate consumption.

The content delivery network 100 comprises a number of servers which are arranged to deliver the video content, typically when requested to do so. In a typical implementation, the content delivery network 100 is arranged to have an origin server 110 which receives and stores the digital video content from the video source 20, and several delivery servers, or edge servers 120, 130, 140. In practice, origin servers may act as edge servers, and vice versa depending on how the content delivery network 100 is configured and the source of the video content. The content delivery network 100 exists to provide quick, robust delivery of video content to multiple video clients in geographically different locations. By having more than one server, and by caching information on the delivery servers, requests for video content can be handled quicker because the video content may be located at a delivery server 120, 130, 140 which is located nearer to a requesting video client than the origin server 110, or via a more robust, quicker or cheaper data communication path. Likewise, the number of requests for video content is distributed amongst the servers 110, 120, 130, 140 and is not handled at a single server, therefore reducing the risk of capacity problems at a given server. By caching video content at the delivery servers 120, 130, 140, bandwidth within the content delivery network is used more efficiently, as otherwise the same video content must be sent several times from the origin server 110 to the delivery servers 120, 130, 140 to handle different requests for the video content. Each delivery server may source the required video content from the origin server 110 or, preferably, another delivery server if available at the delivery server and that delivery server is geographically closer to the requesting delivery server, or is connected via a more robust, quicker or cheaper data communication path.

The content delivery network 100 of FIG. 9 is arranged to receive the digital video content from video source 20 and to store the digital video content. The digital video content may be provided in an original format or in multiple different formats. The digital video content is received by and stored on the origin server 110, or elsewhere on the content delivery network 100 as appropriate, and is converted into one or more other formats as necessary. For example, the CDN may be arranged to transcode the digital video content into multiple resolution formats, with those formats being available in a single multi-resolution file or in separate files. For the purposes of this description, the original format or the one or more other formats stored or created and stored on the CDN are named storage formats. The storage formats are typically used to serve video clients and may also be called delivery formats.

The server 200 provides digital video content to one or more video clients, and the server 200 is configured to receive the digital video content from the content delivery network 100, either from the origin server 110 or the delivery servers 120, 130, 140. The digital video content received from the content delivery network 100 is received in the storage format of the content delivery network. The storage format may or may not be best suited for or decodeable by a relevant video client wishing to receive, decode and present the digital video content. When necessary, the server 200 is configured to convert the digital video content from the storage format into a playback format of a relevant video client requesting the digital video content. Here, the playback format means in a format that is best suited for or that can be decoded by a corresponding video client requesting the digital video content so that the digital video content can be presented by or at the requesting video client. Particularly, the playback format is optimized for the requirements and/or abilities of the requesting video client. For example, the requesting video client may be able to decode and display the digital video content in the delivery format of the content delivery network 100, but instead receives an optimized playback format via server 200. In other cases, server 200 provides the requesting video client with the digital video content in a usable form where the delivery format of the content delivery network is a non-usable format for the requesting video client. The server 200 is configured to output the digital video content in the playback format for the requesting video client. The server typically has an IP address which is different to the content delivery network.

In this way, a server which is separate from the content delivery network 100 is able to control the creation of different versions of the digital video content, normally on request from one or more video clients. This allows a content delivery network 100 to store a minimal number of versions of the digital video content reducing memory and file management costs, or to store the same number of versions of the digital video content as before, thus reducing any need to modify the implementation of an existing content delivery network. Additionally, in this way, frequent updates to server 200 will allow for the provision of up-to-date versions of the digital video content to be created regardless of which content delivery network provides the digital video content, with potentially lower and quicker implementation costs.

In more detail, converting the digital video content comprises one or more of transcoding, transrating and transizing the digital video content from the delivery format of the content delivery network 100 to the playback format provided by the server 200. Transcoding means changing the underlying coding technique used to create a coded representation of the digital video data. Many coding techniques are known to persons skilled in the art including MPEG-2, MPEG-4 Part, VP8, VP9, H.264/AVC, or H.265/HEVC. Transrating means changing the number of bits required to represent the digital video content. This may be achieved for example by changing the colour depth used per pixel, or changing the quantization value used when encoding the digital video content. Additionally, the bitrate may be reduced by reducing the frame rate in the playback format version of the digital video content. Transizing means reducing (or increasing) the frame size or resolution of the digital video content thereby reducing the number of pixels encoded, which in turn reduces the bitrate of the encoded video content.

The server 200 is also configured to convert the digital video content from the storage format of the content delivery network 100 into a secondary format in some applications. The secondary format is hierarchical and uses the concept of hierarchical layers to store the video content in a way which uses storage space advantageously and efficiently and allows for efficient conversion into the playback formats needed. The required format comprises a base layer and an enhancement layer, wherein the base layer is decodable to present the digital video content at a base level of video reproduction quality, and the enhancement layer is decodable with the base layer to present the digital video content at an enhanced level of video reproduction quality which is higher than the base level of reproduction quality.

There may be more than one enhancement layer, with each successive enhancement layer adding further information to the base layer, and optionally, previous enhancement layers in the hierarchy. An enhancement layer may be logically split to provide varying levels of quality enhancements, each of which may be used or ignored as necessary.

The server 200 is configured to choose a number of enhancement layers or logical enhancement layers depending on the levels of quality required of the hierarchical secondary format. For example, the base layer may provide the digital video content having a frame size of 240p (320.times.240 pixels) and a first enhancement layer which allows reproduction at 480p (640.times.480 pixels) and a second enhancement layer which allows reproduction at 720p (1280.times.720 pixels). The requesting video client may then dynamically choose to stream the base layer, the base layer plus the first enhancement layer, or the base layer plus the first enhancement layer and the second enhancement layer depending on the circumstances, for example the bandwidth available at the video client to stream the digital video content. A higher bandwidth would normally allow the video content to stream at a higher frame size, as represented by the base layer and additional enhancement layers. Each enhancement layer may not relate exclusively or partly to increased frame size or resolution. Instead, each enhancement layer may increase the frame rate or PSNR, or colour depth or bitrate as required.

Figure 10:
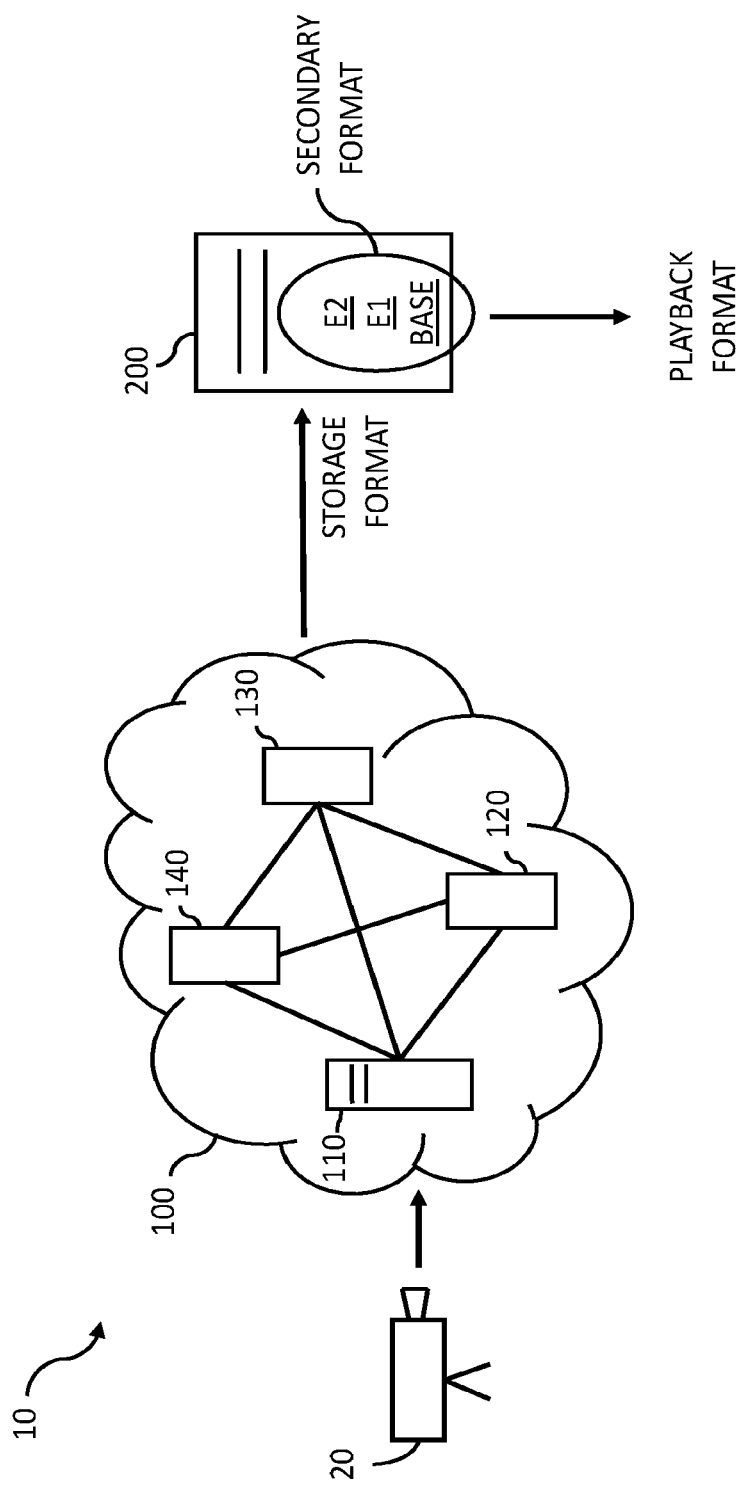
FIG. 10 is a schematic diagram illustrating a server storing the digital video content in a hierarchical secondary format.

FIG. 10 is a schematic diagram illustrating the server 200 storing the digital video content in the hierarchical secondary format. Here, the secondary format comprises a base layer, BASE, and two enhancement layers, E1 and E2. The layers are used to create the playback format output by the server 200.

Figure 11:
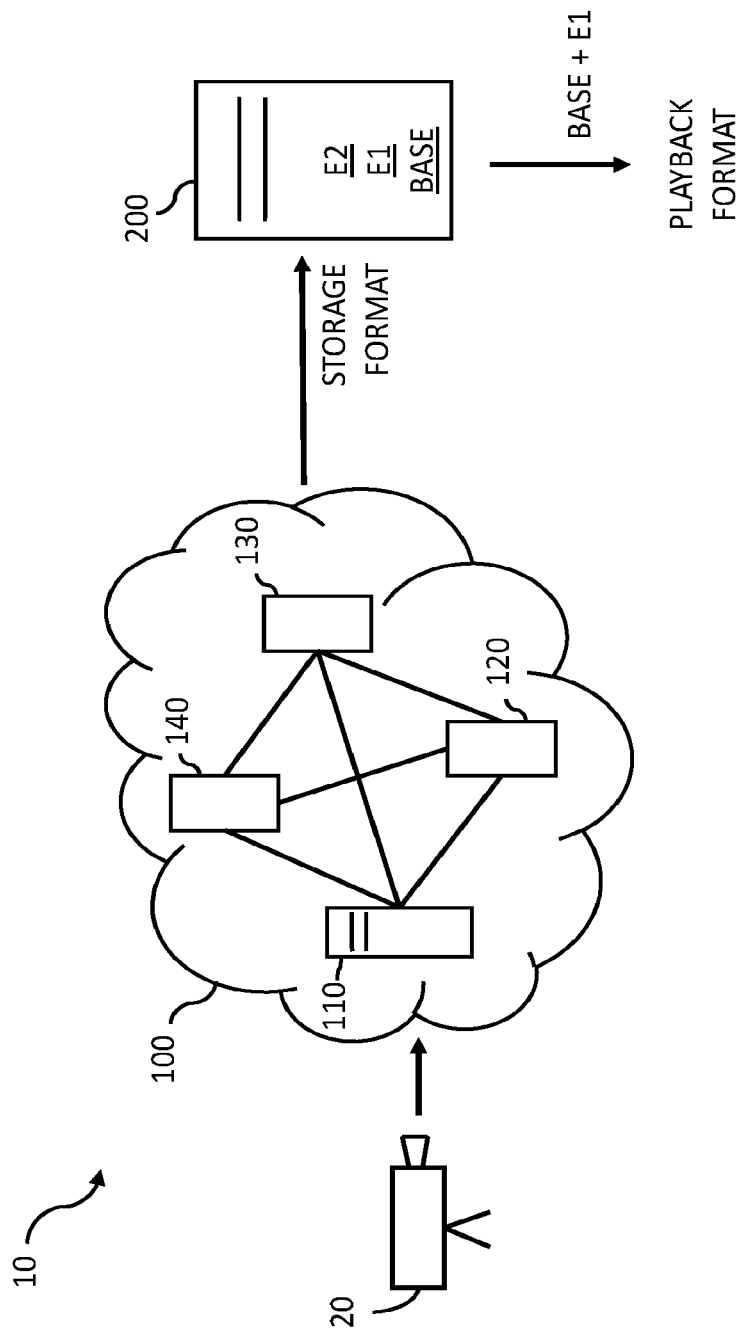
FIG. 11 is a schematic diagram which illustrates the server determining which layers of the hierarchical secondary format to use.

FIG. 11 is a schematic diagram which illustrates the server 200 determining which layers of the hierarchical secondary format to use.

The server 200 is configured to determine, based on a target quality of the digital video content which is to be provided to a video client, which layers in the hierarchy to use to achieve the target quality. The server 200 is configured to use the determined layers to output the digital video content in the playback format for the video client at the target level of quality. This follows on from the above discussion in which each layer in the hierarchy may provide video reproduction at a higher quality when measured by one or more of frame size, resolution, frame rate, PSNR, colour depth and bitrate. For example, a video client requesting a frame size of 480p would need to use the base layer and first enhancement layer.

In a first mode of operation in which the hierarchical secondary format is decodeable by the video client, the server 200 is configured to output the base layer when the base layer is available, and later to output the enhancement layer when the enhancement layer is available, so at least a base level of video reproduction quality is available to present to a user at or by the requesting video client. The base layer, at the lowest quality level in the hierarchy, is typically, but not always, created first. Regardless of which layer is created first, the other layers will need the base layer in order to be decoded, and so the base layer is advantageously output first, when available.

Figure 12:
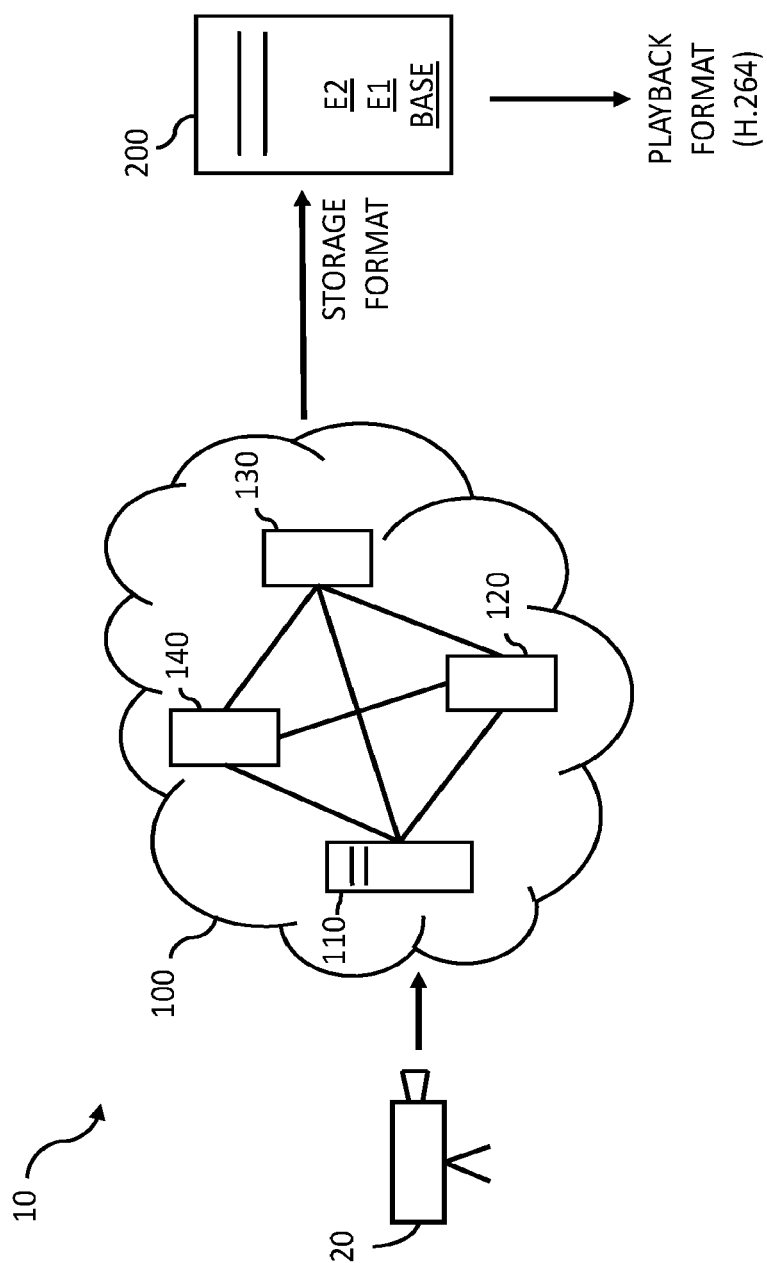
FIG. 12 is a schematic diagram illustrating how the base and first enhancement layer of the hierarchical secondary format is converted into a single layer format (e.g. H.264 compatible) to create the playback format necessary for the requesting client device.

FIG. 12 is a schematic diagram illustrating how the base and first enhancement layer of the hierarchical secondary format is converted into a single layer format (e.g. H.264 compatible) to create the playback format necessary for the requesting client device.

Here, a second mode of operation is shown in which at least one layer of the hierarchical secondary format is not decodeable by the requesting video client, the server 200 is configured to convert the video content represented by the determined layers of the secondary format to create equivalent video content in the playback format, in this case a single layer H. 264 format. The base layer and both enhancement layers E1 and E2 are used to meet the target quality for the client video.

In the example embodiments described, the server 200 stores the digital video content in the secondary format as a base layer, indicated as BASE, and two enhancement layers, indicated as E1 and E2. Ideally, the server 200 creates and stores the digital video content in the secondary format at a maximum or near maximum level of quality as provided by the content delivery network 100. Ideally, lossless or near lossless compression is used to store the video content the secondary format (as measured when using all hierarchical layers for reproduction).

As already mentioned, if a video client is not compliant with the encoding scheme underlying the secondary format, then the server 200 is arranged to transcode the digital video content from the secondary format to a compliant format. For example, the secondary format may represent the digital video content encoded with a particular codec which is not supported by the video client, and the server 200 is arranged to transcode the secondary format into a format using a codec which is supported by the video client. If possible, the server 200 uses only the base layer to transcode to meet the required target quality for the video client, but will use the enhancement layer or layers to obtain the necessary data to meet the required target quality, for example measured by a target frame size, frame rate, PSNR level, as explained, and bitrate encoded using a coding scheme supported by the video client.

Also, the server 200 is arranged to transrate the video content as necessary prior to output, for example when the bandwidth connection between the content delivery network 100 or the server 200 and the client device is insufficient to stream the video content at the bitrate of the playback format originally required. Transrating is performed to alter the bitrate of the playback format, and may simply be achieved by outputting or converting only a subset of the available hierarchical layers in the secondary format, such as the base layer, or the base layer and one or both enhancement layers, or transrating an already created playback format. Transrating can also be performed in addition to transcoding.

Figure 13:
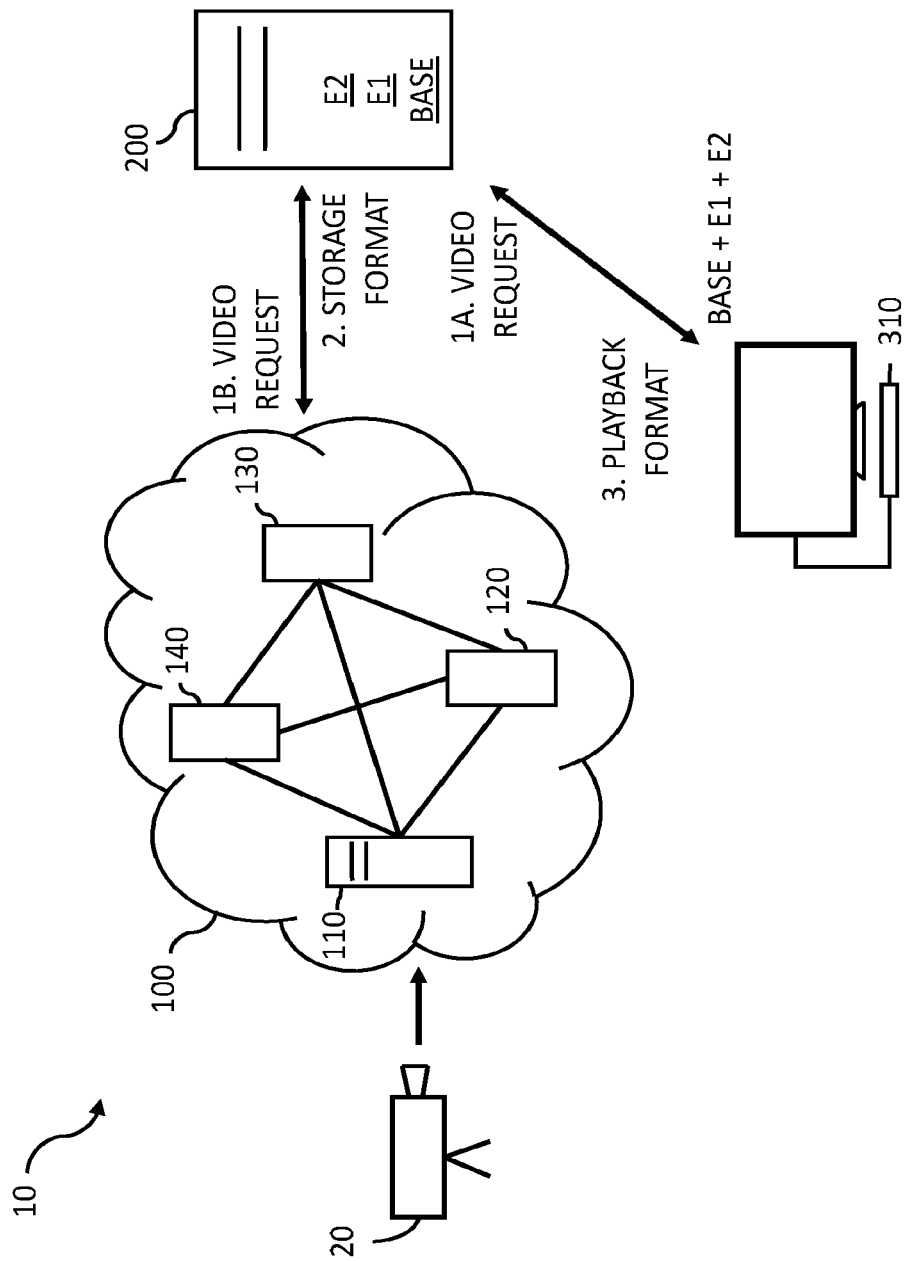
FIG. 13 is a block diagram showing a first client device requesting video content from the content delivery network via server.

FIG. 13 is a block diagram showing the system 10 of FIGS. 1 to 4 in which a first client device 310 requests the video content from the content delivery network 100 via server 200.

In this example, the first client device 310 is a set-top box which is arranged to stream video content over-the-top ("OTT") of a public communications network, such as the Internet. Here, the set-top-box 310 is a relatively advanced set-top-box and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The set-top box 310 is also compatible with 1080p HDTV and lower resolutions.

The set-top box 310 is connected to the content delivery network 100 through server 200, which acts as a proxy server to the content delivery network 100. The bandwidth connection between the set-top box 310 and the server 200, and between the server 200 and the content delivery network 100 is excellent, and can support the highest quality of video able to be decoded by the set-top box 310. Also, the set-top box 310 is compliant with the secondary format and so can decode the video content directly when provided in the secondary format. Server 200 therefore serves the video content to the set-top box 310 in the maximum version of the secondary format, that is, serving both the base layer B and both enhancement layers E1 and E2. If the bandwidth of the data connection between the set-top box 310 and the server 200 reduces, then the server 200 or the set-top box 310 can decide to stream the video content at a lower bitrate, by lowering the frame size, frame rate, PSNR quality level, and/or by changing the encoding scheme. This may be achieved by dropping one or both enhancement layers data from transmission, or by transcoding and/or transrating the video content at the server 200.

Figure 14:
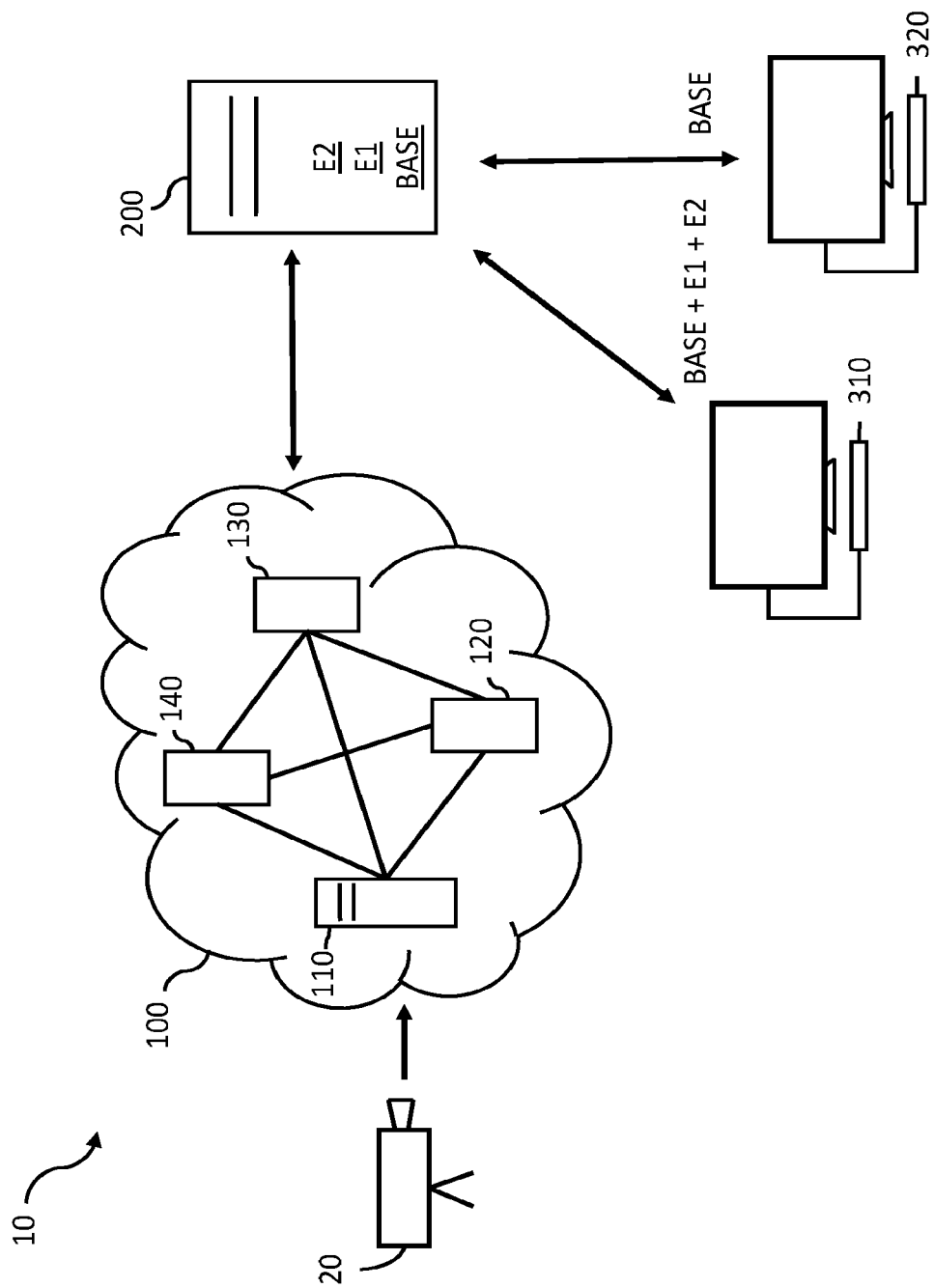
FIG. 14 is a block diagram showing the system of FIG. 13 in which a second client device requests video content from the content delivery network via server.

FIG. 14 is a block diagram showing the system 10 of FIG. 13 in which a second client device 320 requests the video content from the content delivery network 100 via server 200.

In this example, the second client device 320 is another set-top box which is arranged to stream video content over-the-top ("OTT") of a public communications network, such as the Internet. Here, the set-top-box 320 is less capable in relation to the first set-top box 310, and can decode 1080p HDTV and lower resolutions, but not higher resolutions and frame sizes.

The second set-top box 320 is connected to the content delivery network 100 through proxy server 200. The bandwidth connection between the second set-top box 320 and the server 200 is good, and can support the highest quality of video able to be decoded by the set-top box. Also, second set-top box 320 is compliant with the secondary format and so can decode the video content directly in the secondary format. Server 200 therefore serves the video content to the second set-top box 320 in a version of the storage format best suited to the capabilities of the second set-top box 320, that is, by serving only the base layer B. If the bandwidth of the data connection between the second set-top box 320 and the server 200 reduces, then the server 200 or the second set-top box 320 can decide to stream the video content at a lower bitrate, by lowering the frame size, frame rate, PSNR quality level, and/or by changing the encoding scheme. This is achieved by transcoding and/or transrating the video content in the server 200.

Figure 15:
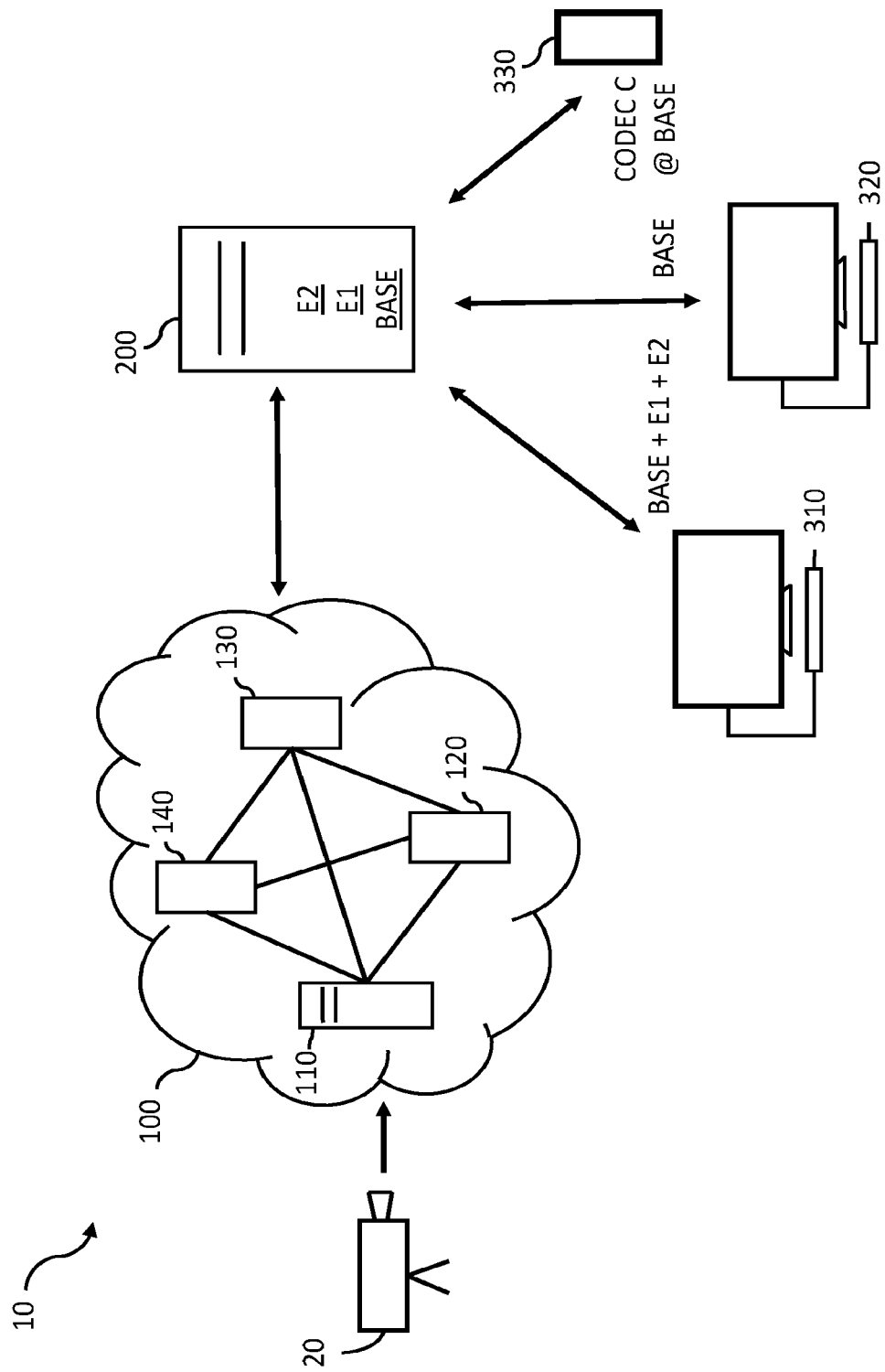
FIG. 15 is a block diagram showing the system of FIG. 14 in which a third client device requests a video content from the content delivery network via server.

FIG. 15 is a block diagram showing the system 10 of FIG. 14 in which a third client device 330 requests the video content from the content delivery network 100 via server 200.

In this example, the third client device 330 is a mobile telephone with video playback capability, and could be a tablet computer. The third client device 330 is arranged to stream video content over-the-top ("OTT") of a public communications network, such as the Internet, or via a cellular data connection or equivalent. Here, the mobile telephone 330 is as capable as the first set-top box 310, and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The mobile telephone 330 is also compatible with 1080p HDTV and lower resolutions.

The mobile telephone 330 is connected to the content delivery network 100 through server 200. The bandwidth connection between the mobile telephone 330 and the server 200 is adequate to support a medium quality of video to be streamed by the mobile telephone 330. Mobile telephone 330 is not compliant with the storage format or the secondary format and so cannot decode the video content directly in the storage format or secondary format. Instead, the mobile telephone 330 requires the video content to have been encoded using encoding scheme C. In this scenario, the server 200 is arranged to transcode the video content from the encoding scheme of the storage format to encoding scheme C using the base layer B but not the first enhancement layer E1 because the enhancement layer data is not needed to provide the video content at the required quality at the mobile telephone 330.

The transcoding can involve changing the codec used, or changing coding parameters to ensure compatibility. In this example, the encoding standard required by mobile telephone 330 is not compatible with the storage format (which may be the original encoding standard and set-up used to create the video content), nor the encoding used to create the secondary format.

By transcoding only the base layer and not the enhancement layer, computational resources are used more efficiently and the transcoding can be performed more quickly, especially when the base layer already exists on server 200 through serving another video client.

Figure 16:
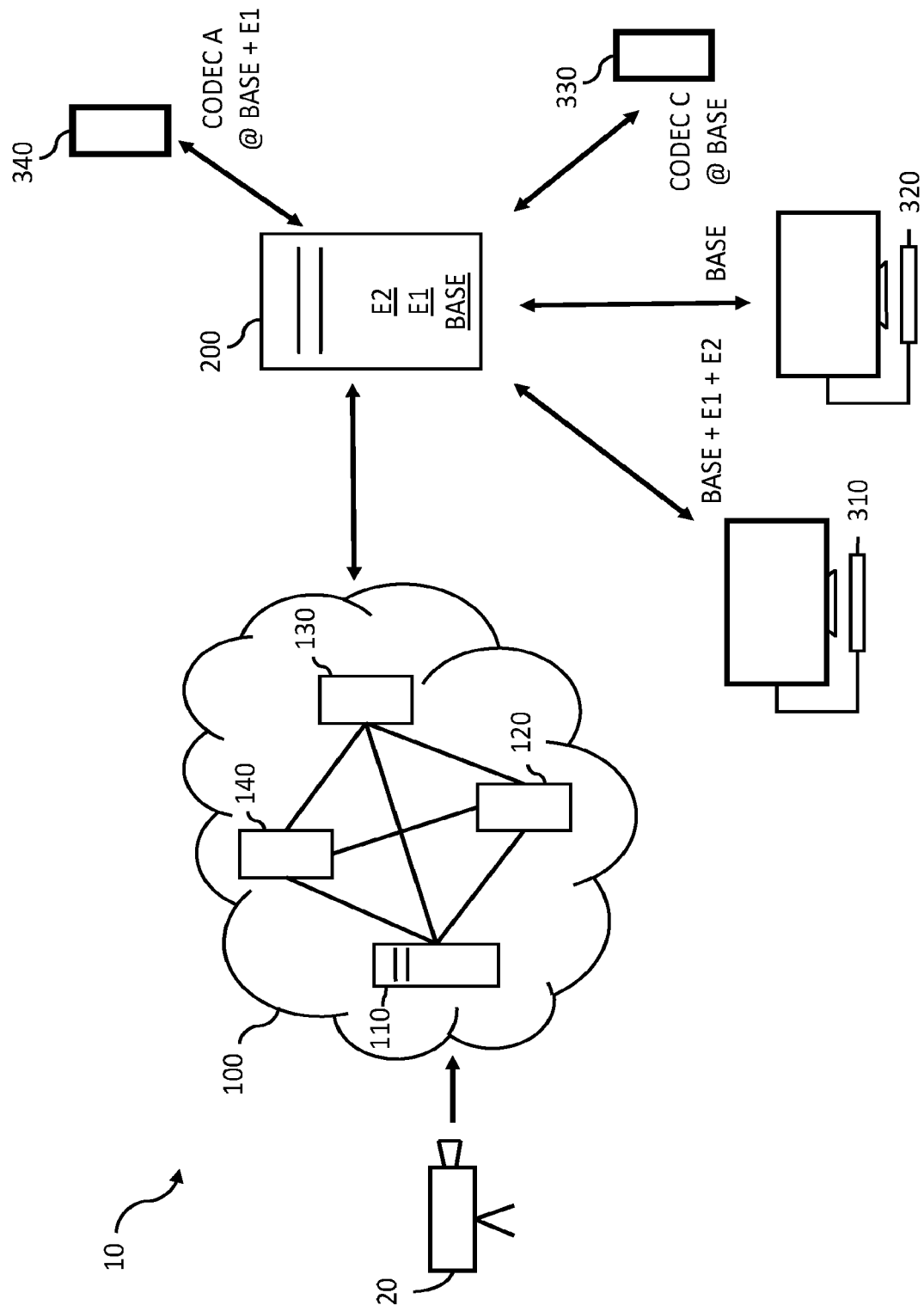
FIG. 16 is a block diagram showing the system of FIG. 15 in which a fourth client device requests video content from the content delivery network via server.

FIG. 16 is a block diagram showing the system 10 of FIG. 15 in which a fourth client device 340 requests the video content from the content delivery network 100 via server 200.

In this example, the fourth client device 340 is a mobile telephone with video playback capability, and could be a tablet computer or any other device with video playback capability. The mobile telephone 340 is arranged to stream video content over-the-top ("OTT") of a public communications network, such as the Internet, or via a cellular data connection. Here, the mobile telephone 340 is as capable as the first set-top box 310 and mobile telephone 330, and can decode ultra-high definition video such as 4K UHDTV (also known as 2160p which is 3840 pixels wide by 2160 pixels tall) and also 8K UHDTV (also known as 4320p which is 7680 pixels wide by 4320 pixels tall). The mobile telephone 340 is also compatible with 1080p HDTV and lower resolutions.

The mobile telephone 340 is connected to the content delivery network 100 through server 200. The bandwidth connection between the mobile telephone 340 and the delivery server 200 is adequate to support the highest quality of video able to be decoded by the mobile telephone 340. Mobile telephone 340 is not compliant with the secondary format and so cannot decode the video content directly in the secondary format. Instead, the mobile telephone 240 requires the video content to have been encoded using encoding scheme A (which is the original encoding scheme used to encode the video content and which is also the storage format). In this scenario, the server 200 is arranged to transcode the video content from the secondary format to encoding scheme A because the secondary format does not use encoding scheme A, for example because some transcoding was used to create the secondary format. The transcoding back to encoding scheme A uses both the base layer B and the first enhancement layer E1 because the enhancement layer data is needed to provide the video content at a high enough quality. However, the second enhancement layer E2 is not needed to meet the target quality. Also, the digital video data provided to the mobile telephone 340 is at a lower bitrate when compared to the original bitrate of the video content as provided by the video source 20. This is achieved at least partly by not using the second enhancement layer E2 or by transrating at the server 200. Alternatively, if possible, the storage format may be served directly to the client device 340, or served after transizing or transrating.

The transcoding can simply involve putting the base layer and the enhancement layer into a more typical single layer format if the video client cannot handle a multi-layer structure, or can involve changing the codec used, or changing coding parameters to ensure compatibility.

The enhancement layer data may only be generated at the server 200 when needed to serve a video client, directly or via transcoding.

While the above examples have been described with a base layer and two enhancement layers, the advantages achieved are enhanced by providing varying levels of enhancement layer data, either by providing fewer or more enhancement layers or by providing a single enhancement layer which is logically partitioned into a plurality of logical enhancement layers. In this way, video clients can be served with the video content at various resolutions, at various frame rates, at various bit rates, and also at various PSNR ratios.

For example, one particular secondary format may use an H.264/AVC codec having a base layer and two enhancement layers or two logical partitions within a single enhancement layer file. The base layer has a bit rate of 3.5 Mbit/s and is decodeable to present the digital video content at a base level of video reproduction quality, which in this example is 1080p @ 30 fps. Here, the PSNR is better than 40 dB. The first enhancement layer or logical section allows the base layer reproduction to be upscaled to 4K UHD @ 30 fps and the data in the first enhancement layer has a bit rate of 2.5 Mbit/s making a cumulative bit rate for the base layer and first enhancement layer of 6 Mbit/s. The second enhancement layer, or logical partition, allows the video reproduction from the base layer and first enhancement layer to be upscaled to 8K UHD @ 30 fps. The second enhancement layer has an individual bit rate of 3 Mbit/s making a cumulative bit rate for the base layer, first enhancement layer and second enhancement layer of 9 Mbit/s.

In another example, the secondary format uses an MPEG2 compliant codec and has a base layer and three enhancement layers. The base layer provides a video resolution of 240p @ 15 fps and has a bit rate of 400 Kbit/s. The first enhancement layer provides additional data to upscale the resolution from 240p to 480p and also increase the frame rate from 15 fps to 30 fps. The first enhancement layer has a bit rate of 600 Kbit/s and the base layer and first enhancement layer have a cumulative bit rate of 1 Mbit/s. The second enhancement layer upscales to 720p @ 30 fps and the cumulative bit rate is 2 Mbit/s. The third enhancement layer upscales to 1080p @ 30 fps and the cumulative bit rate for all layers is 3 Mbit/s.

Full discussions on how the base layers and enhancement layers are encoded are given in international patent applications published as WO 2013/171173, WO 2014/170819, U.S. Ser. No. 13/188,226 and U.S. Ser. No. 13/188,201 all of which are incorporated herein by reference.

Whilst the above examples relate to the provision of encoding video content, the techniques are generally applicable to any type of data with scalable quality output such as audio data, still images in two or multiple dimensions, volumetric data, and three-dimensional video data.

While the examples shown relate to OTT delivery of video over a data communications network including at least a public network part, such as the Internet, the data communications network could be a wholly private network.

Figure 17:
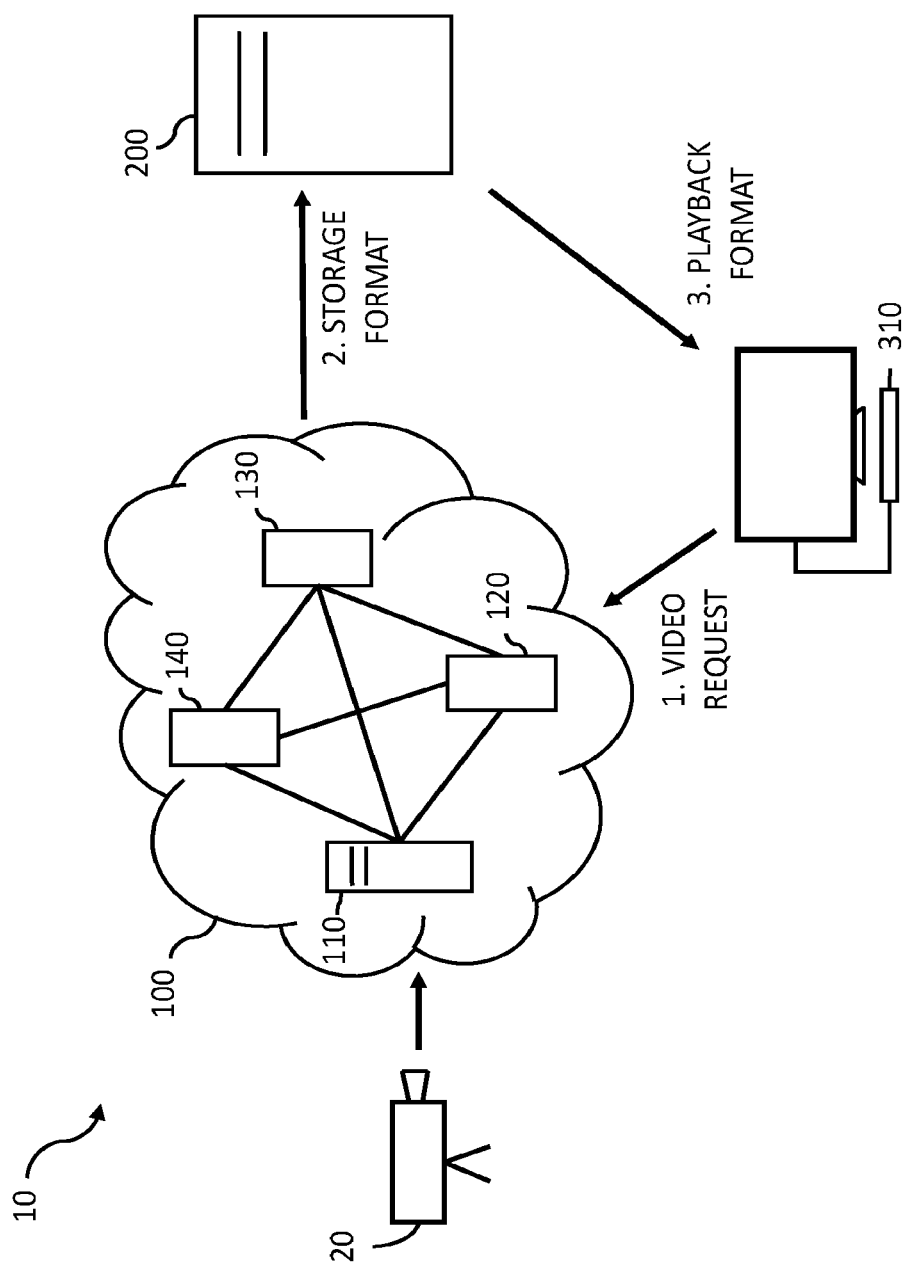
FIG. 17 is a schematic diagram illustrating an alternative configuration of the system shown in FIGS. 13 to 16.

FIG. 17 is a schematic diagram illustrating a slightly different configuration of system 10 shown in FIGS. 13 to 16.

Here, instead of server 200 acting as a proxy server, through which all communications between the content delivery network 100 and client devices 310, 320, 330, 340 take place, the request for video content originating from one of the client devices 310, 320, 330, 340 is initially passed to content delivery network 100. The content delivery network 100 then passes the requested digital video content in the storage format to the server 200 which then converts the storage format into the secondary format in order to serve client devices 310, 320, 330, 340 directly as described already with reference to FIGS. 13 to 16.

Figure 18:
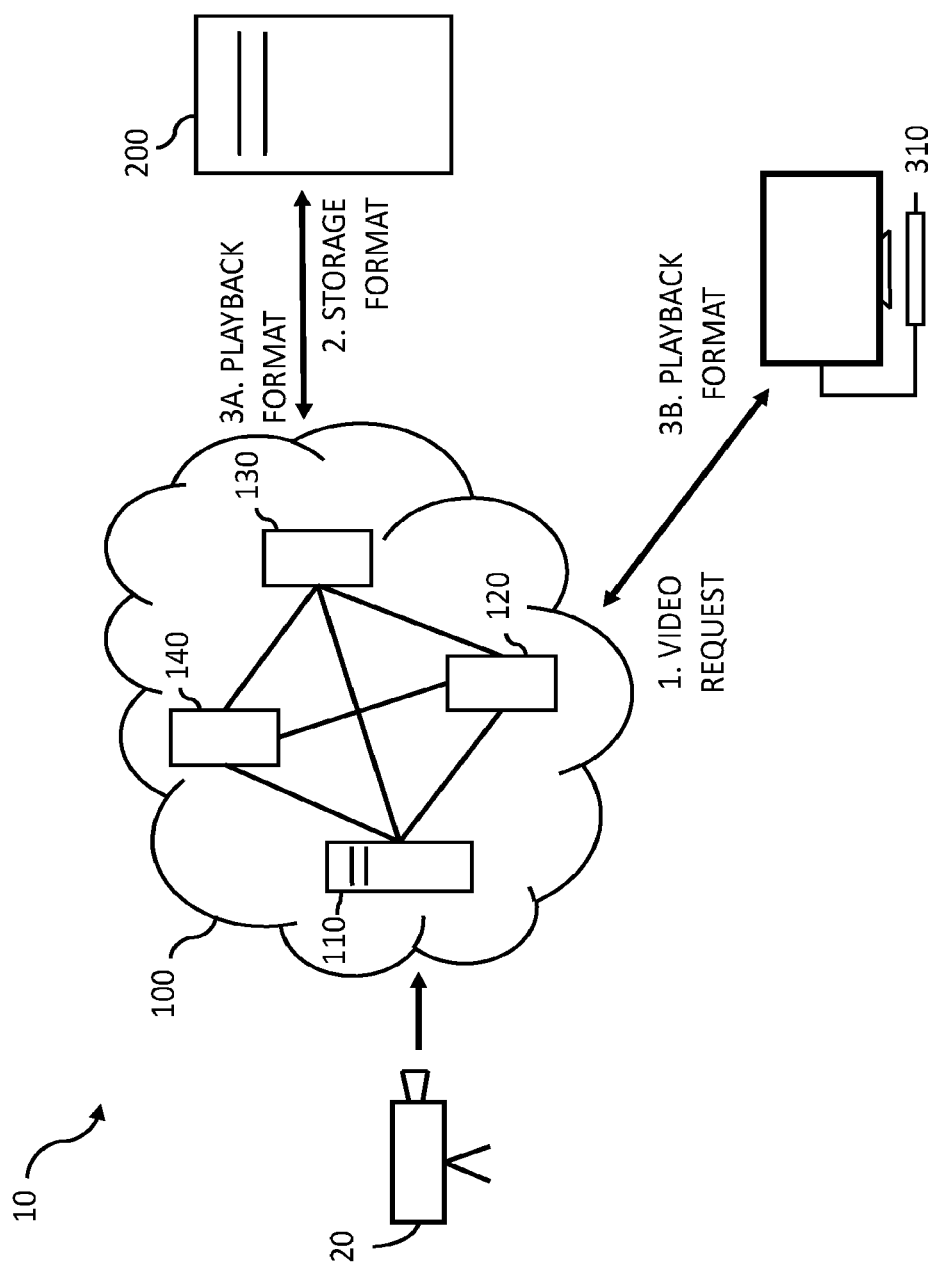
FIG. 18 is a schematic diagram in which client devices request and receive digital video content from the content delivery network directly.

In a further modification, FIG. 18 is a schematic diagram in which client devices 310, 320, 330, 340 request digital video content from the content delivery network 100 directly, and receive the digital video content from the content delivery network 100. However, in this implementation the content delivery network 100 requests server 200 to perform conversion for the storage format of the content delivery network into the playback format as required.

Figure 19:
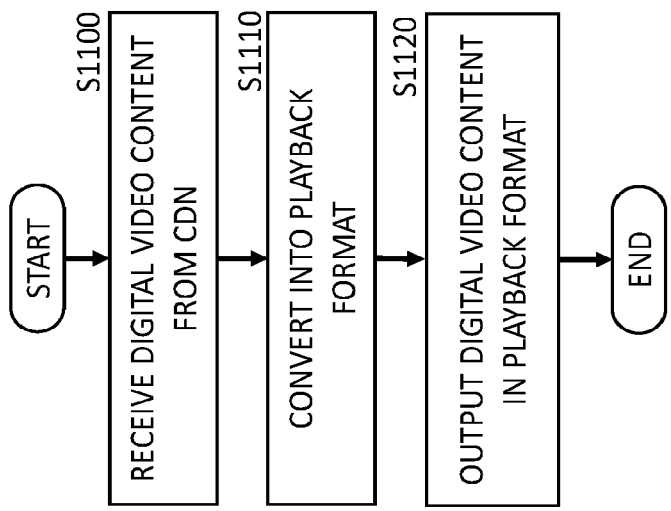
FIG. 19 is a flow chart outlining a method of streaming digital video content across a data network.

FIG. 19 is a flow chart outlining a method of streaming digital video content across a data network. The flow chart is described with reference to the steps shown in FIG. 19 in ascending number order as follows:

S1100: Digital video content is received at the server 200 from the content delivery network (CDN) 100. The digital video content is in a storage format, also termed a delivery format, and is selected for provision to the server based on the needs of a requesting video client 310, 320, 330, 340. For example, known techniques of requesting the digital video content in a pre-prepared frame size may be employed where there are a choice of versions (i.e. formats). The digital video content may be converted into delivery format by the content delivery network 100 itself, either before a request is made, or on-the-fly.

S1110: Regardless of how the delivery format is created, the digital video content received from the content delivery network 100 is converted from the delivery format into a playback format for a requesting video client 310, 320, 330, 340, as already described earlier in the detailed description of the embodiments.

S1120: The digital video content in the playback format is then outputted for delivery to the requesting video client 310, 320, 330, 340. The digital video content in the playback format may be sent directly to the requesting video client 310, 320, 330, 340 or sent via the content delivery network 100, or via some other route.

The above steps are preferably performed on the server 200 previously described, and which is separate from the content delivery network.

Figure 20:
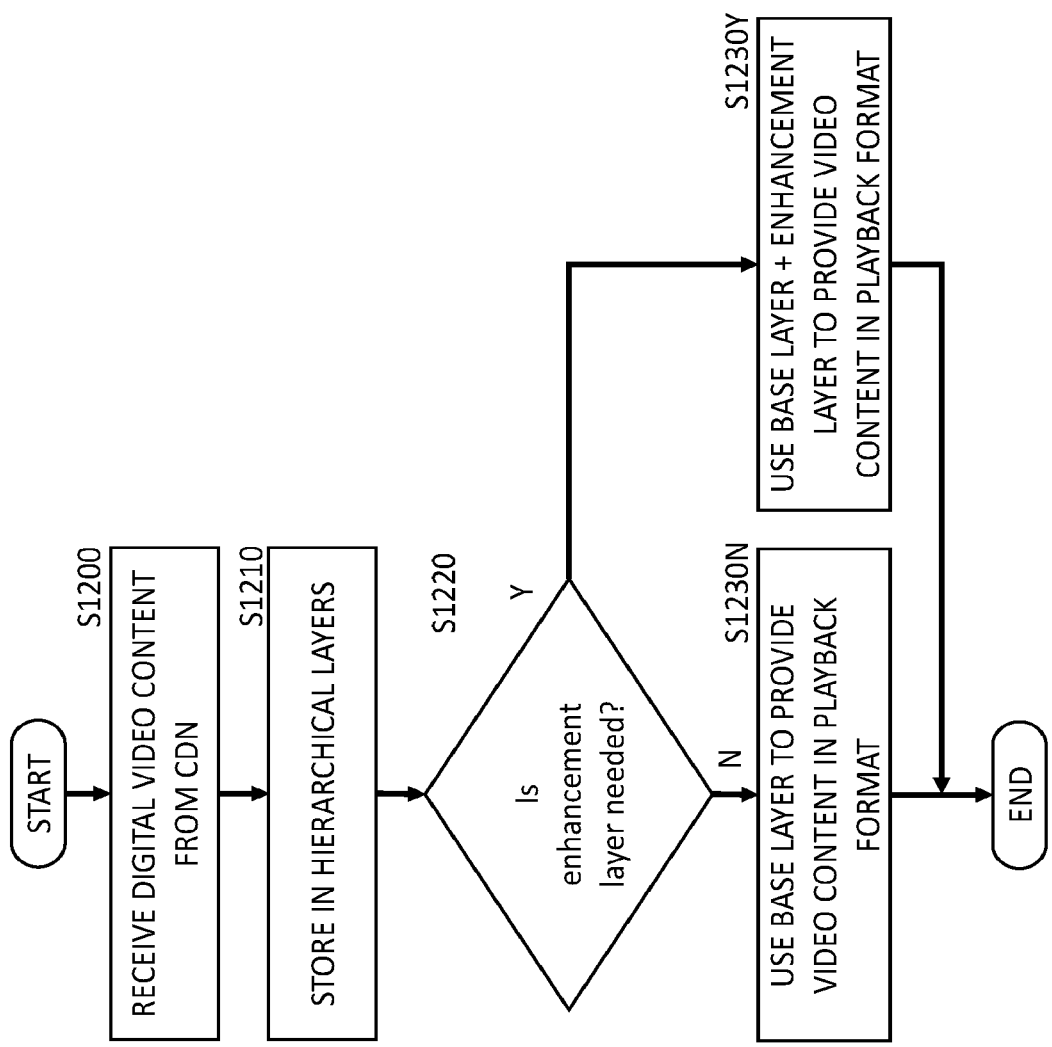
FIG. 20 is a flow chart outlining a more detailed method of streaming digital video content across a data network.

FIG. 20 is a flow chart outlining a more detailed method of streaming digital video content across a data network. The flow chart is described with reference to the steps shown in FIG. 19 in ascending number order as follows:

S1200: Digital video content is received at the server 200 from the content delivery network (CDN) 100. The digital video content is in a storage format, also termed a delivery format, and is selected for provision to the server based on the needs of a requesting video client 310, 320, 330, 340. For example, known techniques of requesting the digital video content in a pre-prepared frame size may be employed where there are a choice of versions (i.e. formats). The digital video content may be converted into delivery format by the content delivery network 100 itself, either before a request is made, or on-the-fly.

S1210: Regardless of how the delivery format is created, the digital video content received from the content delivery network 100 is converted from the delivery format into a secondary format as already described earlier in the detailed description of the embodiments. The secondary format comprises a base layer and at least one enhancement layer. The base layer is decodeable to present the digital video content at a base level of video reproduction quality. The at least one enhancement layer is decodeable with the base layer to present the digital video content at an enhanced level of video reproduction quality.

S1220: A determination is made, based on a target quality which is to be provided to a requesting video client 310, 320, 330, 340, of which layers of the secondary format are to be used to create the digital video content in a playback format which achieves the target quality at the requesting video client 310, 320, 330, 340.

S1230N: If no enhancement layer data is required, the method is configured to use the base layer to provide the digital video content to the requesting video client. The base layer may be provided directly to the client device or may be transcoded or transrated as required in order to provide the requesting video client 310, 320, 330, 340 with a preferred compatible format.

S1230Y: If it is determined that at least some enhancement layer data is required to provide the digital video content at the target quality which is to be provided to the video client 310, 320, 330, 340, then enhancement layer data is obtained and is used together with the base layer to create the digital video content in a playback format at the target level of quality.

Further features of the two methods described will be apparent from the description of the content delivery network in relation to FIGS. 9 to 18.

Video clients can be informed of the availability of different levels of quality of the video content by a descriptor file at each server in the content delivery network, regardless of whether or not a particular server has cached the base layer and all of the enhancement layers. In this way, the video client can request a suitably high level of quality for the digital video content, even if that digital video content does not exist on the delivery server, or is not derivable by the delivery server without further information being obtained within the content delivery network.

The server is independent of the content delivery network. The server is not controlled by content delivery network in any way. The server has a different IP address to the content delivery network.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

The use of modular structure such as the one depicted in any of the Figures provides also an advantage from an implementation and integration point of view, enabling a simple integration into legacy systems as well as compatibility with legacy systems. By way of example, the adaptive bit rate coding method could be embodied as a plug-in (including libraries and/or source code) to an existing firmware and/or software which already embodies a legacy decoding system (for example one that is already installed in legacy decoders).

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying claims.

The invention claimed is:

1. A server for providing digital video content to a video client, the server being configured to:
receive digital video content from a content delivery network, the digital video content being in a delivery format of the content delivery network, the digital video content comprising information which can be transcoded to provide a plurality of levels of quality to requesting clients, and the delivery format being a non-usable format for a video client;
store the digital video content on the server, the stored video content comprising a base layer and an enhancement layer, wherein the base layer is stored on the server and is decodable to present the digital video content at a base level of video reproduction quality, wherein the enhancement layer is stored on the server and is combinable with the base layer to present the digital video content at an enhanced level of video reproduction quality which is higher than the base level of reproduction quality;

receive a request from the video client for the digital video content, the video client having a capability to reproduce the digital video content in a particular format at a target level of quality;

determine which layers to provide to the video client in order to achieve the target quality;

convert the determined layers of the digital video content from the delivery format of the content delivery network to a playback format for the video client such that the digital video content can be provided to the video client in the playback format and such that the video client can reproduce the digital video content at the target level of quality, wherein converting the digital video content comprises transcoding the digital video content and wherein transcoding comprises changing a codec family, resolution, frame rate, or bitrate of the digital video content to a playback format compatible with the video client; and output the digital video content in the playback format for the video client.

2. The server of claim 1, wherein the server being configured to convert the digital video content from the delivery format of the content delivery network to provide the digital video content in a playback format of a video client requesting the digital video content comprises one or more of transrating and transizing the digital video content in the delivery format.

3. The server of claim 1, wherein the server is configured to convert the digital video content from the delivery format of the content delivery network into a hierarchical secondary format comprising a base layer and an enhancement layer, wherein the base layer is decodable to present the digital video content at a base level of video reproduction quality, and the enhancement layer is decodable with the base layer to present the digital video content at an enhanced level of video reproduction quality which is higher than the base level of reproduction quality.

4. The server of claim 3, wherein the enhancement layer comprises a plurality of logical enhancement layers.

5. The server of claim 4, wherein the server is configured to choose a number of enhancement layers or logical enhancement layers depending on the levels of quality required of the hierarchical secondary format.

6. The server of claim 5, wherein the server is configured to:
determine, based on the target quality of the digital video content which is to be provided to the video client, which layers to use in order to achieve the target quality; and
use the determined layers to output the digital video content in the playback format for the video client at the target level of quality.

7. The server of claim 1, wherein, in a first mode of operation in which the hierarchical secondary format is decodable by the video client, the server is configured to output the base layer when the base layer is available, and to output the enhancement layer when the enhancement layer is available, so that at least a base level of video reproduction quality is available to present to a user.

8. The server of claim 7, wherein, in a second mode of operation in which the at least one layer of the hierarchical secondary format is not decodable by the video client, the server is configured to convert the video content represented by the determined layers to create the equivalent video content in the playback format.

9. The server of claim 1, wherein the delivery format and the playback format are based on different encoding schemes, and the server is configured to transcode the digital video content from the delivery format into the playback format.

10. The server of claim 9, wherein the transcoding into the playback format is done on-the-fly in response to a request for the digital video content from the video client.

11. The server of claim 10, wherein the server is configured to act as a proxy to direct a request for the digital video content from the video client to the content delivery network.

12. A method for providing digital video content to a video client, the method comprising:
receiving digital video content from a content delivery network, the digital video content being in a delivery format of the content delivery network, the digital video content comprising information which can be transcoded to provide a plurality of levels of quality to requesting clients, and the delivery format being a non-usable format for a video client;
storing the digital video content on the server, the stored video content comprising a base layer and an enhancement layer, wherein the base layer is stored on the server and is decodable to present the digital video content at a base level of video reproduction quality, wherein the enhancement layer is stored on the server and is combinable with the base layer to present the digital video content at an enhanced level of video reproduction quality which is higher than the base level of reproduction quality;
receiving a request from the video client for the digital video content, the video client having capability to reproduce the digital video content in a particular format at a target level of quality;
determining which layers to provide to the video client in order to achieve the target quality;
converting the determined layers of the digital video content from the delivery format into a playback format for the video client requesting the digital video content such that the digital video content can be provided to the video client in the playback format and such that the video client can reproduce the digital video content at the target level of quality, wherein converting the digital video content comprises transcoding the digital video content and wherein transcoding comprises changing a codec family, resolution, frame rate, or bitrate of the digital video content to a playback format compatible with the video client; and
outputting the digital video content in the playback format.

13. The method of claim 12, wherein the converting comprises one or more of transrating and transizing the digital video content in the delivery format.

14. The method of claim 13, wherein the method comprises converting the digital video content from the delivery format of the content delivery network into a hierarchical secondary format comprising a base layer and an enhancement layer, wherein the base layer is decodable to present the digital video content at a base level of video reproduction quality, and the enhancement layer is decodable with the base layer to present the digital video content at an enhanced level of video reproduction quality which is higher than the base level of reproduction quality.

15. The method of claim 14, wherein the enhancement layer comprises a plurality of logical enhancement layers, wherein the method is configured to choose a number of enhancement layers or logical enhancement layers depending on the levels of quality required of the hierarchical secondary format, wherein the method comprises:
   determining, based on the target quality of the digital video content which is to be provided to the video client, which layers to use in order to achieve the target quality; and
   using the determined layers to output the digital video content in the playback format for the video client at the target level of quality.

16. The method of claim 14,
   wherein, in a first mode of operation in which the hierarchical secondary format is decodable by the video client, the method comprises outputting the base layer when the base layer is available, and outputting the enhancement layer when the enhancement layer is available, so that at least a base level of video reproduction quality is available to present to a user, and
   wherein, in a second mode of operation in which the at least one layer of the hierarchical secondary format is not decodable by the video client, the method comprises converting the video content represented by the determined layers to create the equivalent video content in the playback format.

17. The method of claim 12, wherein the delivery format and the playback format are based on different encoding schemes, and the server is configured to transcode the digital video content from the delivery format into the playback format.

18. The method of claim 17, wherein the transcoding into the playback format is done on-the-fly in response to a request for the digital video content from the video client.

19. The method of claim 12, wherein the method is performed on a server which is configured to act as a proxy to direct a request for the digital video content from the video client to the content delivery network.

20. The method of claim 12, wherein the digital video content is arranged in multi-second or part-second segments in one or both of the delivery format and the playback format.

* * * * *